US012634954B2

(12) United States Patent
Hsieh et al.

(10) Patent No.: US 12,634,954 B2
(45) Date of Patent: May 19, 2026

(54) METHOD AND APPARATUS FOR SCHEDULING OF MULTI-CELL UPLINK AND DOWNLINK TRANSMISSIONS WITH SINGLE DOWNLINK CONTROL INFORMATION

(71) Applicant: MediaTek Inc., Hsinchu City (TW)

(72) Inventors: Chi-Hsuan Hsieh, Hsinchu City (TW); Yi-Ju Liao, Hsinchu City (TW); Wei-De Wu, Hsinchu City (TW); Pei-Kai Liao, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 331 days.

(21) Appl. No.: 18/228,025

(22) Filed: Jul. 31, 2023

(65) Prior Publication Data

US 2024/0057109 A1 Feb. 15, 2024

Related U.S. Application Data

(60) Provisional application No. 63/371,232, filed on Aug. 12, 2022.

(51) Int. Cl.
*H04W 72/23* (2023.01)
*H04W 72/12* (2023.01)
*H04W 72/1263* (2023.01)
*H04W 72/232* (2023.01)

(52) U.S. Cl.
CPC ..... *H04W 72/232* (2023.01); *H04W 72/1263* (2013.01)

(58) Field of Classification Search
CPC ........................ H04W 72/232; H04W 72/1263
See application file for complete search history.

(56) References Cited

U.S. PATENT DOCUMENTS

2021/0112528 A1* 4/2021 Lee ........................ H04W 72/23

FOREIGN PATENT DOCUMENTS

WO WO 2021142704 A1 7/2021

OTHER PUBLICATIONS

European Patent Office, Extended European Search Report in European Patent Application No. 23190927.6-1213, Jan. 25, 2024.
(Continued)

*Primary Examiner* — Ronald B Abelson
(74) *Attorney, Agent, or Firm* — Andy M. Han; Han IP PLLC

(57) ABSTRACT

Various solutions for improvement of scheduling multi-cell PUSCH/PDSCH transmission with a single DCI are described. An apparatus may receive a DCI scheduling cells from a network node. The DCI includes at least one of a first DCI, a second DCI, and a third DCI. The apparatus may determine a DCI size budget of the DCI counted in one cell. The apparatus may perform a DCI decoding according to the DCI size budget and perform a PDSCH reception or a PUSCH transmission with at least one cell based on the DCI. The first DCI includes a common bit field, a first specific bit field and a plurality of designated bit fields corresponding to the cells, the second DCI includes the common bit field, a second specific bit field and a first part of the designated bit fields, and the third DCI includes a second part of the designated bit fields.

20 Claims, 14 Drawing Sheets

(56) References Cited

OTHER PUBLICATIONS

Moderator (Lenovo): "Feature lead summary #1 on multi-cell PUSCH/PDSCH scheduling with a single DCI", 3GPP Draft; R1-2205234, 3GPP, RAN WG1, e-Meeting; May 9-May 20, 2022, May 11, 2022, XP052204058.

NTT DOCOMO et al: "Multi-carrier enhancements for NR", 3GPP Draft; RP-221436, 3GPP TSG RAN, Budapest, Hungary; Jun. 6-Jun. 9, 2022, Jun. 6, 2022, XP052164612.

LG Electronics: "Discussion on Multi-cell PUSCH/PDSCH scheduling with a single DCI", 3GPP Draft; R1-2204631, 3GPP RAN Wg, e-Meeting; May 9-May 20, 2022, Apr. 29, 2022, XP052144038.

ZTE: "Discussin on Multi-cell PDSCH Scheduling via s Single Dci", 3GPP Draft; R1-2005441, 3GPP RAN WG1, e-Meeting; Aug. 17-Aug. 28, 2020, Aug. 8, 2020, XP051917466.

* cited by examiner

300

| 1st cell bit | 2nd cell bit | 3rd cell bit | 4th cell bit |
|---|---|---|---|

FIG. 3

600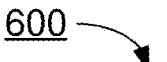

RECEIVE, BY A PROCESSOR OF AN APPARATUS, A DCI SCHEDULING A PLURALITY OF CELLS FROM A NETWORK NODE OF A WIRELESS NETWORK, WHEREIN THE DCI INCLUDES AT LEAST ONE OF A FIRST DCI, A SECOND DCI, AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
610

PERFORM, BY THE PROCESSOR, A PDSCH RECEPTION OR A PUSCH TRANSMISSION WITH AT LEAST ONE OF THE PLURALITY OF CELLS BASED ON THE DCI, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE PLURALITY OF CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE PLURALITY OF CELLS, AND THE THIRD DCI INCLUDES A SECOND PART OF THE DESIGNATED BIT FIELDS CORRESPONDING TO AT LEAST ONE OF THE PLURALITY OF CELLS
620

FIG. 6

700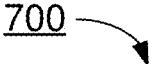

CONFIGURE, BY A PROCESSOR OF A NETWORK NODE, A DCI SCHEDULING A PLURALITY OF CELLS, WHEREIN THE DCI INCLUDES AT LEAST ONE OF A FIRST DCI, A SECOND DCI AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
710

TRANSMIT, BY THE PROCESSOR, THE DCI TO AN APPARATUS OF A WIRELESS NETWORK TO SCHEDULE A PDSCH RECEPTION OR A PUSCH TRANSMISSION WITH AT LEAST ONE OF THE PLURALITY OF CELLS BASED ON THE DCI, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE PLURALITY OF CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE PLURALITY OF CELLS, AND THE THIRD DCI INCLUDES A SECOND PART OF THE DESIGNATED BIT FIELDS CORRESPONDING TO AT LEAST ONE OF THE PLURALITY OF CELLS
720

Figure 8:
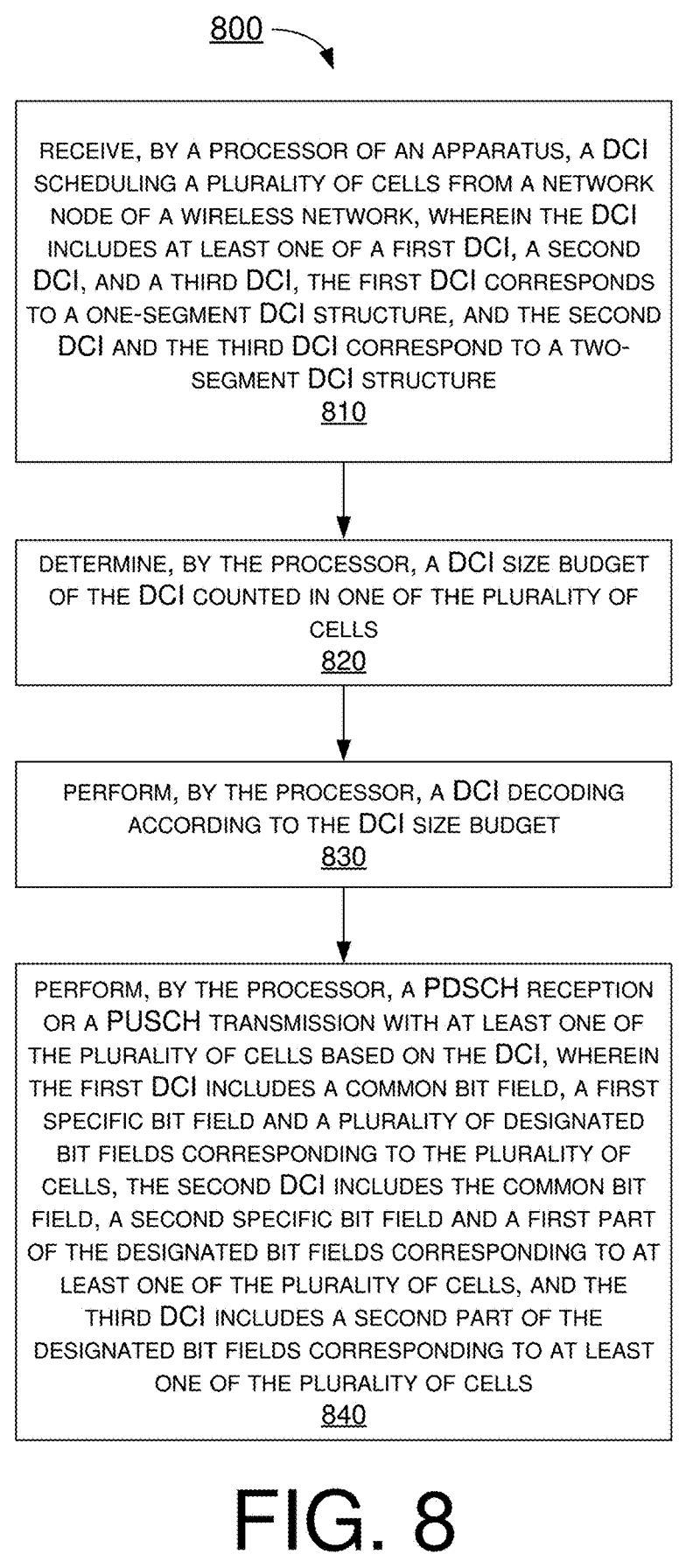

RECEIVE, BY A PROCESSOR OF AN APPARATUS, A DCI
SCHEDULING A PLURALITY OF CELLS FROM A NETWORK
NODE OF A WIRELESS NETWORK, WHEREIN THE DCI
INCLUDES AT LEAST ONE OF A FIRST DCI, A SECOND
DCI, AND A THIRD DCI, THE FIRST DCI CORRESPONDS
TO A ONE-SEGMENT DCI STRUCTURE, AND THE SECOND
DCI AND THE THIRD DCI CORRESPOND TO A TWO-
SEGMENT DCI STRUCTURE
810

DETERMINE, BY THE PROCESSOR, A DCI SIZE BUDGET
OF THE DCI COUNTED IN ONE OF THE PLURALITY OF
CELLS
820

PERFORM, BY THE PROCESSOR, A DCI DECODING
ACCORDING TO THE DCI SIZE BUDGET
830

PERFORM, BY THE PROCESSOR, A PDSCH RECEPTION
OR A PUSCH TRANSMISSION WITH AT LEAST ONE OF
THE PLURALITY OF CELLS BASED ON THE DCI, WHEREIN
THE FIRST DCI INCLUDES A COMMON BIT FIELD, A FIRST
SPECIFIC BIT FIELD AND A PLURALITY OF DESIGNATED
BIT FIELDS CORRESPONDING TO THE PLURALITY OF
CELLS, THE SECOND DCI INCLUDES THE COMMON BIT
FIELD, A SECOND SPECIFIC BIT FIELD AND A FIRST PART
OF THE DESIGNATED BIT FIELDS CORRESPONDING TO AT
LEAST ONE OF THE PLURALITY OF CELLS, AND THE
THIRD DCI INCLUDES A SECOND PART OF THE
DESIGNATED BIT FIELDS CORRESPONDING TO AT LEAST
ONE OF THE PLURALITY OF CELLS
840

Figure 9:
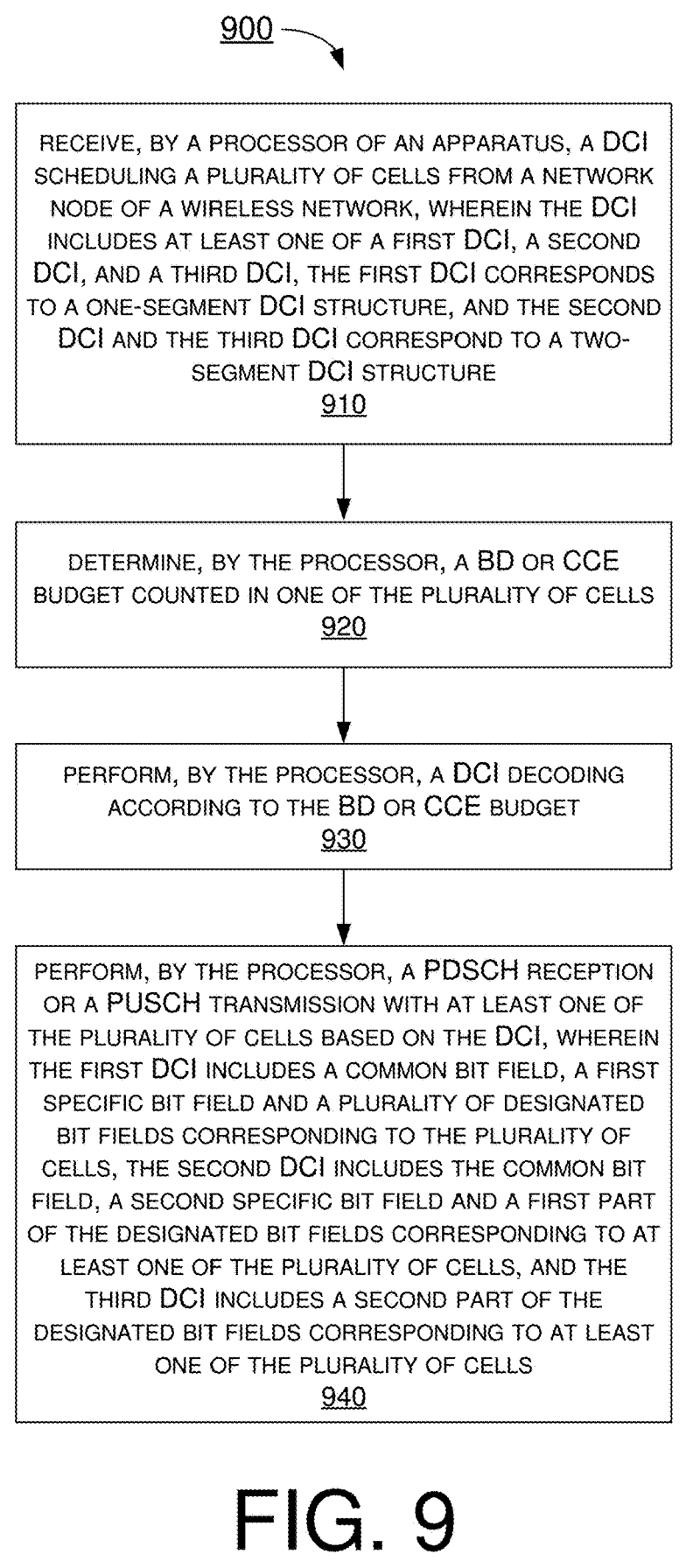

RECEIVE, BY A PROCESSOR OF AN APPARATUS, A DCI
SCHEDULING A PLURALITY OF CELLS FROM A NETWORK
NODE OF A WIRELESS NETWORK, WHEREIN THE DCI
INCLUDES AT LEAST ONE OF A FIRST DCI, A SECOND
DCI, AND A THIRD DCI, THE FIRST DCI CORRESPONDS
TO A ONE-SEGMENT DCI STRUCTURE, AND THE SECOND
DCI AND THE THIRD DCI CORRESPOND TO A TWO-
SEGMENT DCI STRUCTURE
910

DETERMINE, BY THE PROCESSOR, A BD OR CCE
BUDGET COUNTED IN ONE OF THE PLURALITY OF CELLS
920

PERFORM, BY THE PROCESSOR, A DCI DECODING
ACCORDING TO THE BD OR CCE BUDGET
930

PERFORM, BY THE PROCESSOR, A PDSCH RECEPTION
OR A PUSCH TRANSMISSION WITH AT LEAST ONE OF
THE PLURALITY OF CELLS BASED ON THE DCI, WHEREIN
THE FIRST DCI INCLUDES A COMMON BIT FIELD, A FIRST
SPECIFIC BIT FIELD AND A PLURALITY OF DESIGNATED
BIT FIELDS CORRESPONDING TO THE PLURALITY OF
CELLS, THE SECOND DCI INCLUDES THE COMMON BIT
FIELD, A SECOND SPECIFIC BIT FIELD AND A FIRST PART
OF THE DESIGNATED BIT FIELDS CORRESPONDING TO AT
LEAST ONE OF THE PLURALITY OF CELLS, AND THE
THIRD DCI INCLUDES A SECOND PART OF THE
DESIGNATED BIT FIELDS CORRESPONDING TO AT LEAST
ONE OF THE PLURALITY OF CELLS
940

Figure 10:
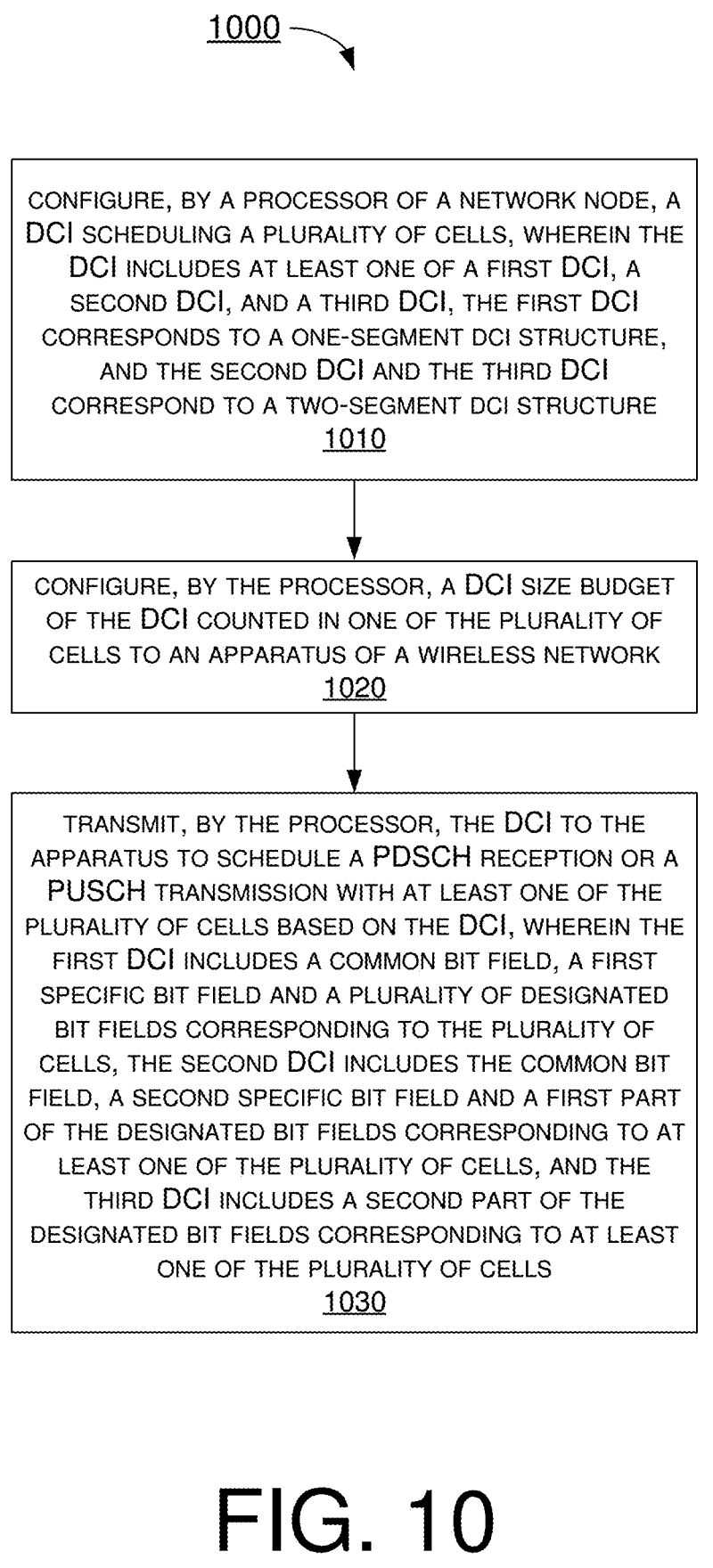

CONFIGURE, BY A PROCESSOR OF A NETWORK NODE, A DCI SCHEDULING A PLURALITY OF CELLS, WHEREIN THE DCI INCLUDES AT LEAST ONE OF A FIRST DCI, A SECOND DCI, AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
1010

CONFIGURE, BY THE PROCESSOR, A DCI SIZE BUDGET OF THE DCI COUNTED IN ONE OF THE PLURALITY OF CELLS TO AN APPARATUS OF A WIRELESS NETWORK
1020

TRANSMIT, BY THE PROCESSOR, THE DCI TO THE APPARATUS TO SCHEDULE A PDSCH RECEPTION OR A PUSCH TRANSMISSION WITH AT LEAST ONE OF THE PLURALITY OF CELLS BASED ON THE DCI, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE PLURALITY OF CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE PLURALITY OF CELLS, AND THE THIRD DCI INCLUDES A SECOND PART OF THE DESIGNATED BIT FIELDS CORRESPONDING TO AT LEAST ONE OF THE PLURALITY OF CELLS
1030

Figure 11:
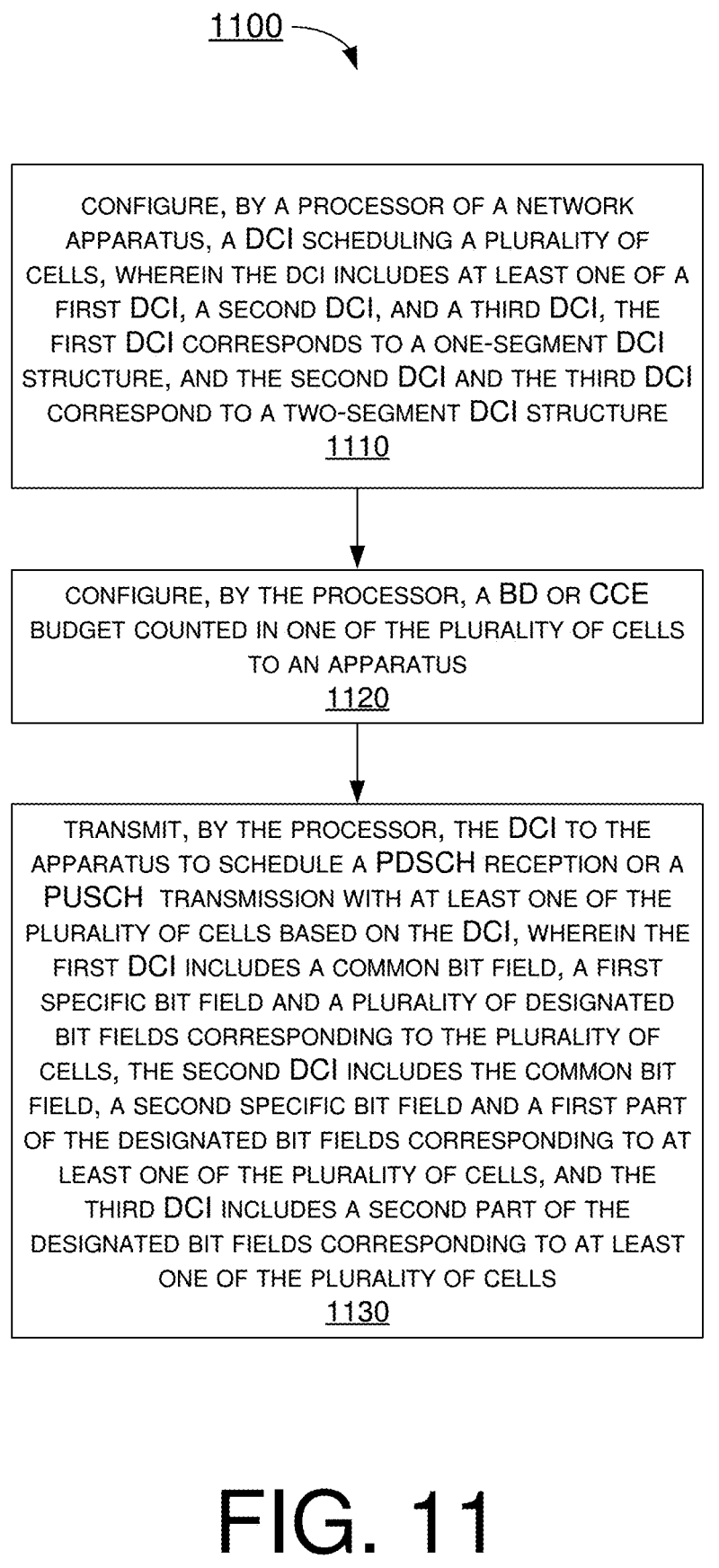

CONFIGURE, BY A PROCESSOR OF A NETWORK APPARATUS, A DCI SCHEDULING A PLURALITY OF CELLS, WHEREIN THE DCI INCLUDES AT LEAST ONE OF A FIRST DCI, A SECOND DCI, AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
1110

CONFIGURE, BY THE PROCESSOR, A BD OR CCE BUDGET COUNTED IN ONE OF THE PLURALITY OF CELLS TO AN APPARATUS
1120

TRANSMIT, BY THE PROCESSOR, THE DCI TO THE APPARATUS TO SCHEDULE A PDSCH RECEPTION OR A PUSCH TRANSMISSION WITH AT LEAST ONE OF THE PLURALITY OF CELLS BASED ON THE DCI, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE PLURALITY OF CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE PLURALITY OF CELLS, AND THE THIRD DCI INCLUDES A SECOND PART OF THE DESIGNATED BIT FIELDS CORRESPONDING TO AT LEAST ONE OF THE PLURALITY OF CELLS
1130

Figure 12:
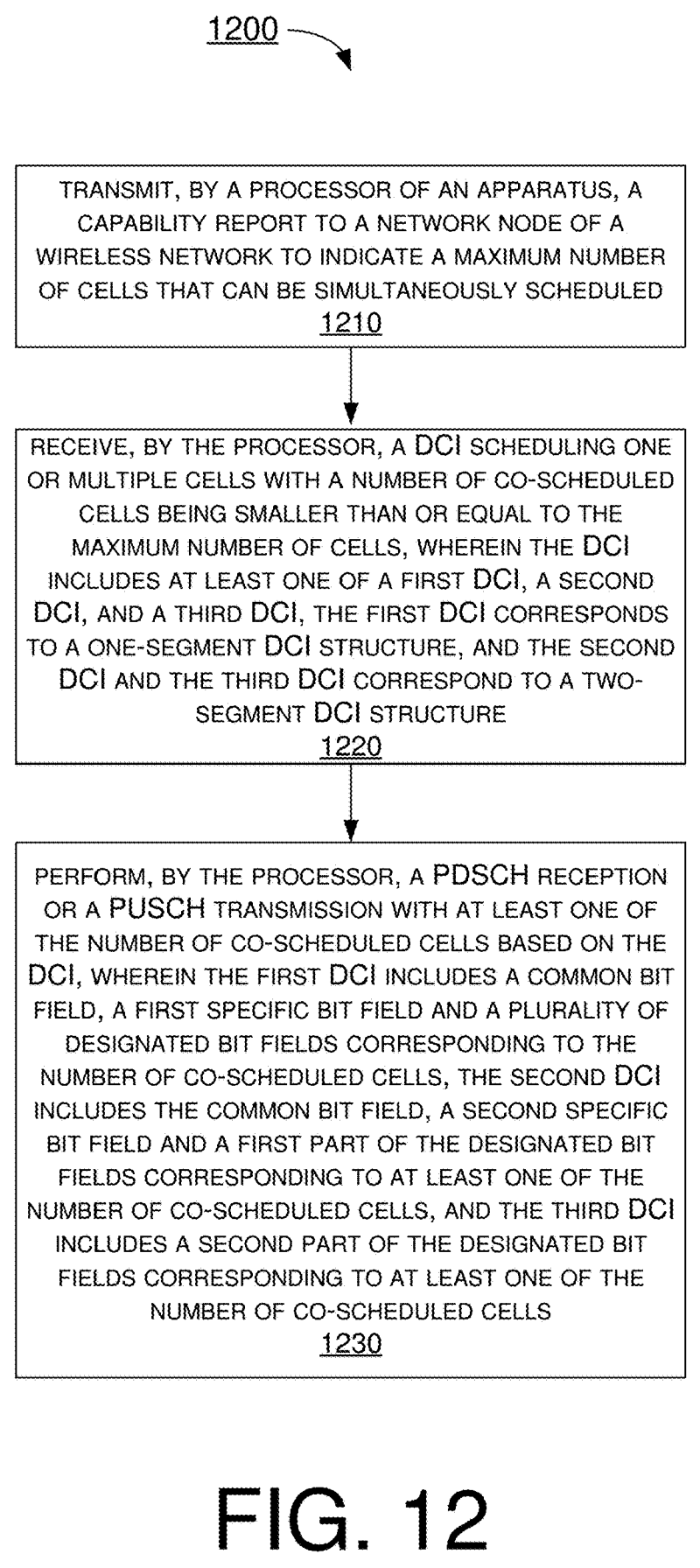

TRANSMIT, BY A PROCESSOR OF AN APPARATUS, A CAPABILITY REPORT TO A NETWORK NODE OF A WIRELESS NETWORK TO INDICATE A MAXIMUM NUMBER OF CELLS THAT CAN BE SIMULTANEOUSLY SCHEDULED
1210

RECEIVE, BY THE PROCESSOR, A DCI SCHEDULING ONE OR MULTIPLE CELLS WITH A NUMBER OF CO-SCHEDULED CELLS BEING SMALLER THAN OR EQUAL TO THE MAXIMUM NUMBER OF CELLS, WHEREIN THE DCI INCLUDES AT LEAST ONE OF A FIRST DCI, A SECOND DCI, AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
1220

PERFORM, BY THE PROCESSOR, A PDSCH RECEPTION OR A PUSCH TRANSMISSION WITH AT LEAST ONE OF THE NUMBER OF CO-SCHEDULED CELLS BASED ON THE DCI, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE NUMBER OF CO-SCHEDULED CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE NUMBER OF CO-SCHEDULED CELLS, AND THE THIRD DCI INCLUDES A SECOND PART OF THE DESIGNATED BIT FIELDS CORRESPONDING TO AT LEAST ONE OF THE NUMBER OF CO-SCHEDULED CELLS
1230

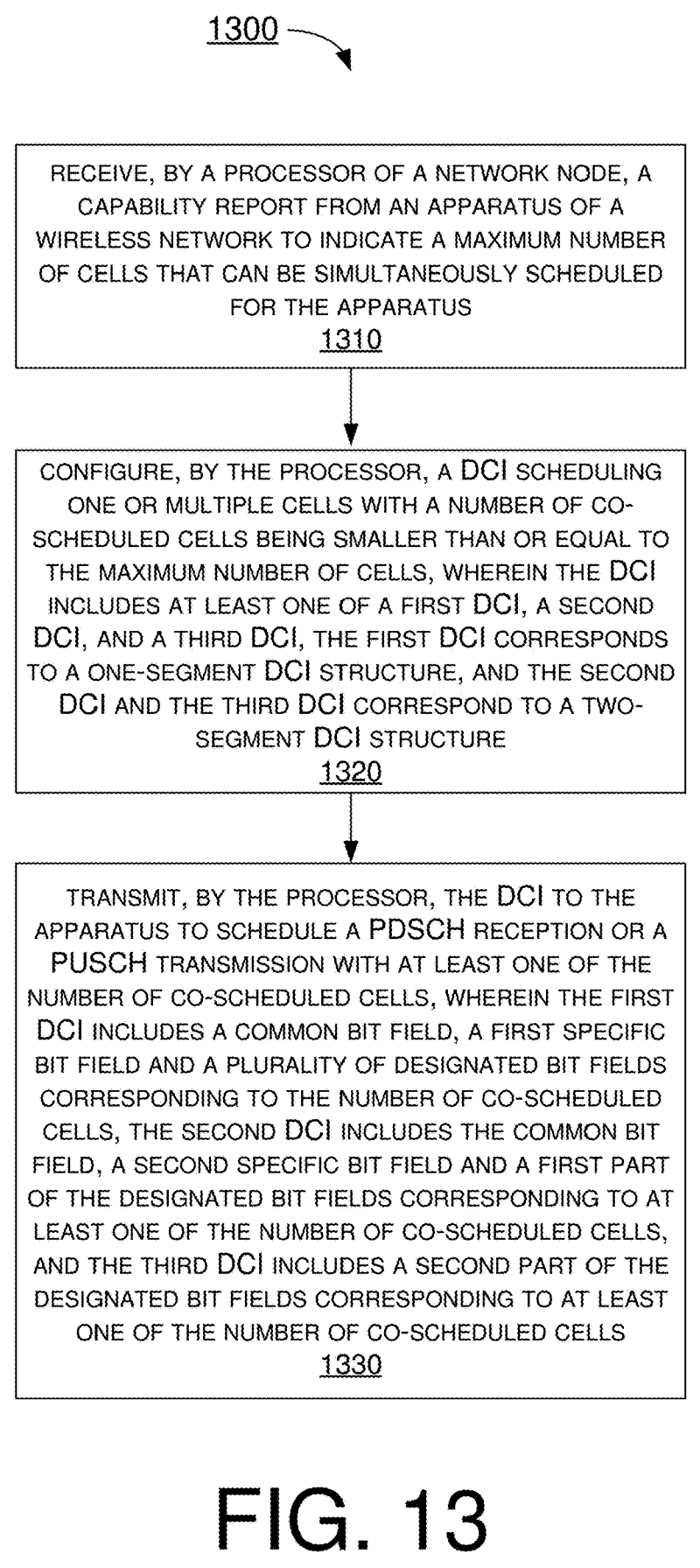

RECEIVE, BY A PROCESSOR OF A NETWORK NODE, A CAPABILITY REPORT FROM AN APPARATUS OF A WIRELESS NETWORK TO INDICATE A MAXIMUM NUMBER OF CELLS THAT CAN BE SIMULTANEOUSLY SCHEDULED FOR THE APPARATUS
1310

CONFIGURE, BY THE PROCESSOR, A DCI SCHEDULING ONE OR MULTIPLE CELLS WITH A NUMBER OF CO-SCHEDULED CELLS BEING SMALLER THAN OR EQUAL TO THE MAXIMUM NUMBER OF CELLS, WHEREIN THE DCI INCLUDES AT LEAST ONE OF A FIRST DCI, A SECOND DCI, AND A THIRD DCI, THE FIRST DCI CORRESPONDS TO A ONE-SEGMENT DCI STRUCTURE, AND THE SECOND DCI AND THE THIRD DCI CORRESPOND TO A TWO-SEGMENT DCI STRUCTURE
1320

TRANSMIT, BY THE PROCESSOR, THE DCI TO THE APPARATUS TO SCHEDULE A PDSCH RECEPTION OR A PUSCH TRANSMISSION WITH AT LEAST ONE OF THE NUMBER OF CO-SCHEDULED CELLS, WHEREIN THE FIRST DCI INCLUDES A COMMON BIT FIELD, A FIRST SPECIFIC BIT FIELD AND A PLURALITY OF DESIGNATED BIT FIELDS CORRESPONDING TO THE NUMBER OF CO-SCHEDULED CELLS, THE SECOND DCI INCLUDES THE COMMON BIT FIELD, A SECOND SPECIFIC BIT FIELD AND A FIRST PART OF THE DESIGNATED BIT FIELDS CORRESPONDING TO AT LEAST ONE OF THE NUMBER OF CO-SCHEDULED CELLS, AND THE THIRD DCI INCLUDES A SECOND PART OF THE DESIGNATED BIT FIELDS CORRESPONDING TO AT LEAST ONE OF THE NUMBER OF CO-SCHEDULED CELLS
1330

FIG. 13

METHOD AND APPARATUS FOR SCHEDULING OF MULTI-CELL UPLINK AND DOWNLINK TRANSMISSIONS WITH SINGLE DOWNLINK CONTROL INFORMATION

CROSS REFERENCE TO RELATED PATENT APPLICATION(S)

The present disclosure is part of a non-provisional application claiming the priority benefit of U.S. Patent Application No. 63/371,232, filed 12 Aug. 2022, the content of which herein being incorporated by reference in its entirety.

TECHNICAL FIELD

The present disclosure is generally related to mobile communications and, more particularly, to scheduling of multi-cell physical uplink shared channel/physical downlink shared channel (PUSCH/PDSCH) transmission with a single downlink control information (DCI).

BACKGROUND

Unless otherwise indicated herein, approaches described in this section are not prior art to the claims listed below and are not admitted as prior art by inclusion in this section.

For current network implementations, one base station (BS) is operable to provide radio coverage to a specific geographical area using a plurality of cells forming a radio access network. The BS may support the operations of the plurality of cells, and each cell may be operable to provide services to at least one user equipment (UE) within its radio coverage. Specifically, each cell may provide services to serve one or more UEs within its radio coverage based on at least one downlink control information (DCI), where a radio coverage of one cell may overlap with another radio coverage of other cell(s). In one example, each cell may schedule a downlink/uplink (DL/UL) resource to one UE within its radio coverage by one DCI for performing a DL/UL transmission.

If the UE can support more than one cells/carriers (e.g., in dual connectivity/carrier aggregation), the UE may receive more than one DCI for scheduling DL/UL transmissions with the more than one cells. As that, the network and the BS have to configure a plurality of DCIs corresponding to the plurality of cells respectively to the UE, so as to schedule resources for the DL/UL transmissions between the UE and the cells, which may lack of transmission efficiency and waste available network resources. In addition, there is a bit number limit for decoding the DCI if one specific decoding technique (e.g., polar decoding technique) is utilized by the UE. Accordingly, a field number/size of the DCI should comply with a bit-limit rule/regulation.

Accordingly, how to improve a scheduling of multi-cell PUSCH/PDSCH transmission with a single DCI becomes an important issue for the newly developed wireless communication network. Therefore, there is a need to provide a proper DCI structure/segment design to improve scheduling efficiency and comply with some specific decoding rules.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to improvement of a scheduling of multi-cell UL (e.g., PUSCH)/DL (e.g., PDSCH) transmission with a single DCI.

In one aspect, a method may involve a processor of an apparatus receiving a DCI scheduling a plurality of cells from a network node of a wireless network. The DCI includes at least one of a first DCI, a second DCI, and a third DCI, the first DCI corresponds to a one-segment DCI structure, and the second DCI and the third DCI correspond to a two-segment DCI structure. The method may also involve the processor of the apparatus determining a DCI size budget of the DCI counted in one of the plurality of cells. The method also involve the processor of the apparatus performing a DCI decoding according to the DCI size budget. The method also involve the processor of the apparatus performing a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In one aspect, a method may involve a processor of an apparatus receiving a DCI scheduling a plurality of cells from a network node of a wireless network. The DCI includes at least one of a first DCI, a second DCI, and a third DCI, the first DCI corresponds to a one-segment DCI structure, and the second DCI and the third DCI correspond to a two-segment DCI structure. The method may also involve the processor of the apparatus determining a blinding decoding (BD) or control channel element (CCE) budget of the DCI counted in one of the plurality of cells. The method also involve the processor of the apparatus performing a DCI decoding according to the BD or CCE budget. The method also involve the processor of the apparatus performing a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In one aspect, an apparatus may include a transceiver which, during operation, wirelessly communicates with a network node of a wireless network. The apparatus may also include a processor communicatively coupled to the transceiver. The processor, during operation, may perform operations including receiving a DCI scheduling a plurality of cells from the network node. The DCI includes at least one of a first DCI, a second DCI, and a third DCI, the first DCI corresponds to a one-segment DCI structure, and the second DCI and the third DCI correspond to a two-segment DCI structure. The processor, during operation, may further perform operations including determining a DCI size budget of the DCI counted in one of the plurality of cells. The processor, during operation, may further perform operations including performing a DCI decoding according to the DCI size budget. The processor, during operation, may further perform operations including performing a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In one aspect, a method may involve a processor of an apparatus transmitting a capability report to a network node of a wireless network to indicate a maximum number of cells that can be simultaneously scheduled. The method may also involve the processor of the apparatus receiving a DCI scheduling one or multiple cells with a number of co-scheduled cells being smaller than or equal to the maximum number of cells. The DCI includes at least one of a first DCI, a second DCI, and a third DCI, the first DCI corresponds to a one-segment DCI structure, and the second DCI and the third DCI correspond to a two-segment DCI structure. The method may also involve the processor of the apparatus performing a PDSCH reception or a PUSCH transmission with at least one of the number of co-scheduled cells based on the DCI. The first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In one aspect, an apparatus may include a transceiver which, during operation, wirelessly communicates with a network node of a wireless network. The apparatus may also include a processor communicatively coupled to the transceiver. The processor, during operation, may perform operations including transmitting a capability report to a network node of a wireless network to indicate a maximum number of cells that can be simultaneously scheduled. The processor, during operation, may perform operations including receiving a DCI scheduling one or multiple cells with a number of co-scheduled cells being smaller than or equal to the maximum number of cells from the network node. The DCI includes at least one of a first DCI, a second DCI, and a third DCI, the first DCI corresponds to a one-segment DCI structure, and the second DCI and the third DCI correspond to a two-segment DCI structure. The processor, during operation, may further perform operations including performing a PDSCH reception or a PUSCH transmission with at least one of the number of co-scheduled cells based on the DCI. The first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In one aspect, a method may involve a processor of a network node receiving a capability report from an apparatus of a wireless network to indicate a maximum number of cells that can be simultaneously scheduled for the apparatus. The method may also involve the processor of the network node configuring a DCI scheduling one or multiple cells with a number of co-scheduled cells being smaller than or equal to the maximum number of cells. The DCI includes at least one of a first DCI, a second DCI, and a third DCI, the first DCI corresponds to a one-segment DCI structure, and the second DCI and the third DCI correspond to a two-segment DCI structure. The method may also involve the processor of the network node transmitting the DCI to the apparatus to schedule a PDSCH reception or a PUSCH transmission with at least one of the number of co-scheduled cells. The first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In one aspect, a method may involve a processor of an apparatus receiving a DCI scheduling a plurality of cells from a network node of a wireless network. The DCI includes at least one of a first DCI, a second DCI, and a third DCI, the first DCI corresponds to a one-segment DCI structure, and the second DCI and the third DCI correspond to a two-segment DCI structure. The method may also involve the processor of the apparatus performing a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In one aspect, an apparatus may include a transceiver which, during operation, wirelessly communicates with a network node of a wireless network. The apparatus may also include a processor communicatively coupled to the transceiver. The processor, during operation, may perform operations including receiving a DCI scheduling a plurality of cells from the network node. The DCI includes at least one of a first DCI, a second DCI, and a third DCI, the first DCI corresponds to a one-segment DCI structure, and the second DCI and the third DCI correspond to a two-segment DCI structure. The processor, during operation, may further perform operations including performing a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram depicting an example illustrating a bitmap of a specific bit field in a DCI in accordance with the present disclosure.

FIG. 6 is a flowchart of an example process in accordance with an implementation of the present disclosure.

FIG. 7 is a flowchart of another example process in accordance with an implementation of the present disclosure.

FIG. 8 is a flowchart of another example process in accordance with an implementation of the present disclosure.

FIG. 9 is a flowchart of another example process in accordance with an implementation of the present disclosure.

FIG. 10 is a flowchart of another example process in accordance with an implementation of the present disclosure.

FIG. 11 is a flowchart of another example process in accordance with an implementation of the present disclosure.

FIG. 12 is a flowchart of another example process in accordance with an implementation of the present disclosure.

FIG. 13 is a flowchart of another example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to improvement of a scheduling of multi-cell PUSCH/PDSCH transmission with a single DCI. According to the present disclosure, a number of possible solutions may be implemented separately or jointly. That is, although these possible solutions may be described below separately, two or more of these possible solutions may be implemented in one combination or another.

In $3^{rd}$ Generation Partnership Project (3GPP), a radio access network (e.g., 5G NR access network) may include a plurality of BSs (e.g., Next Generation Node-Bs (gNBs)) to communicate with a plurality of mobile stations referred as UEs. For current network implementations, one BS is operable to provide radio coverage to a specific geographical area using a plurality of cells forming a radio access network. The BS may support the operations of the plurality of cells, and each cell may be operable to provide services to at least one UE within its radio coverage. Specifically, each cell may provide services to serve one or more UEs within its radio coverage based on at least one DCI, where a radio coverage of one cell may overlap with another radio coverage of other cell(s). In one example, each cell may schedule a DL/UL resource to one UE within its radio coverage by one DCI for performing a DL/UL transmission. If the UE can support more than one cell (e.g., application in dual connectivity or carrier aggregation), the UE may receive more than one DCI for scheduling DL/UL transmissions with the more than one cells.

Figure 1:
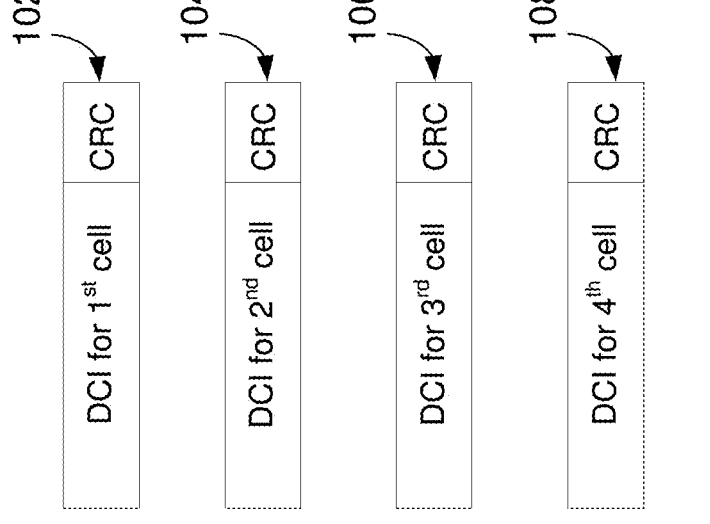
FIG. 1 is a diagram depicting an example scenario of a DCI reception corresponding to a plurality of cells in accordance with the present disclosure.

FIG. 1 illustrates an example scenario 100 of a DCI reception corresponding to a plurality of cells in accordance with the present disclosure. As shown in scenario 100, at least one BS may serve the UE for providing four DCIs 102, 104, 106 and 108. Specifically, the DCI 102 is utilized for a scheduling of a $1^{st}$ cell with the UE, the DCI 104 is utilized for a scheduling of a $2^{nd}$ cell with the UE, the DCI 106 is utilized for a scheduling of a $3^{rd}$ cell with the UE, and the DCI 108 is utilized for a scheduling of a 4th cell with the UE. In one example, each DCI is attached with a cyclic redundancy check (CRC) for error decoding, and includes at least one designated bit field (e.g., 60 bits) and one CRC field (e.g., 24 bits), where the designated bit field includes a scheduling information for one cell. As that, the UE may communicate with the four cells (e.g., $1^{st}$ cell, $2^{nd}$ cell, $3^{rd}$ cell and $4^{th}$ cell) and perform a PDSCH reception or a PUSCH transmission scheduled by the four DCIs 102, 104, 106 and 108, respectively.

Based on different transmissions and capabilities of the UE, the network and the BS may configure a plurality of DCIs corresponding to a plurality of cells to the UE, so as to schedule relevant resources for the DL/UL transmissions between the UE and the cells. However, it seems less efficient if the network resource(s) may not be enough to serve all UEs within the radio coverages. In addition, there is a bit-limit (e.g., less than 140 bits) for decoding the DCI if one specific decoding technique (e.g., polar decoding technique) is utilized by the UE. As that, it is proposed with a DCI aggregation by configuring a single DCI transmitted from the BS to the UE for a scheduling of multi-cell PUSCH/PDSCH transmission.

Figure 2A:
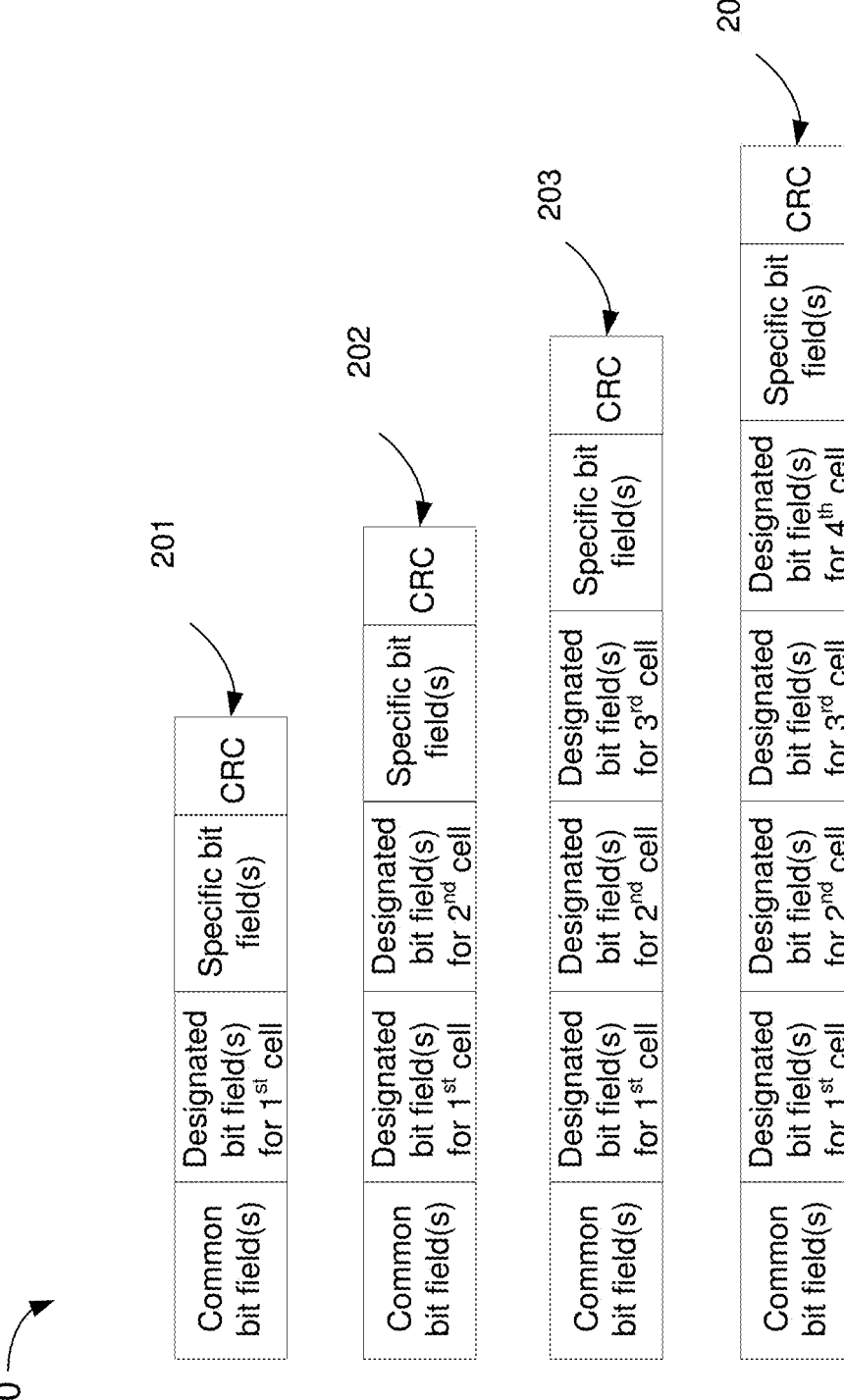
FIG. 2A is a diagram depicting an example scenario illustrating a DCI structure in accordance with the present disclosure.
Figure 2B:
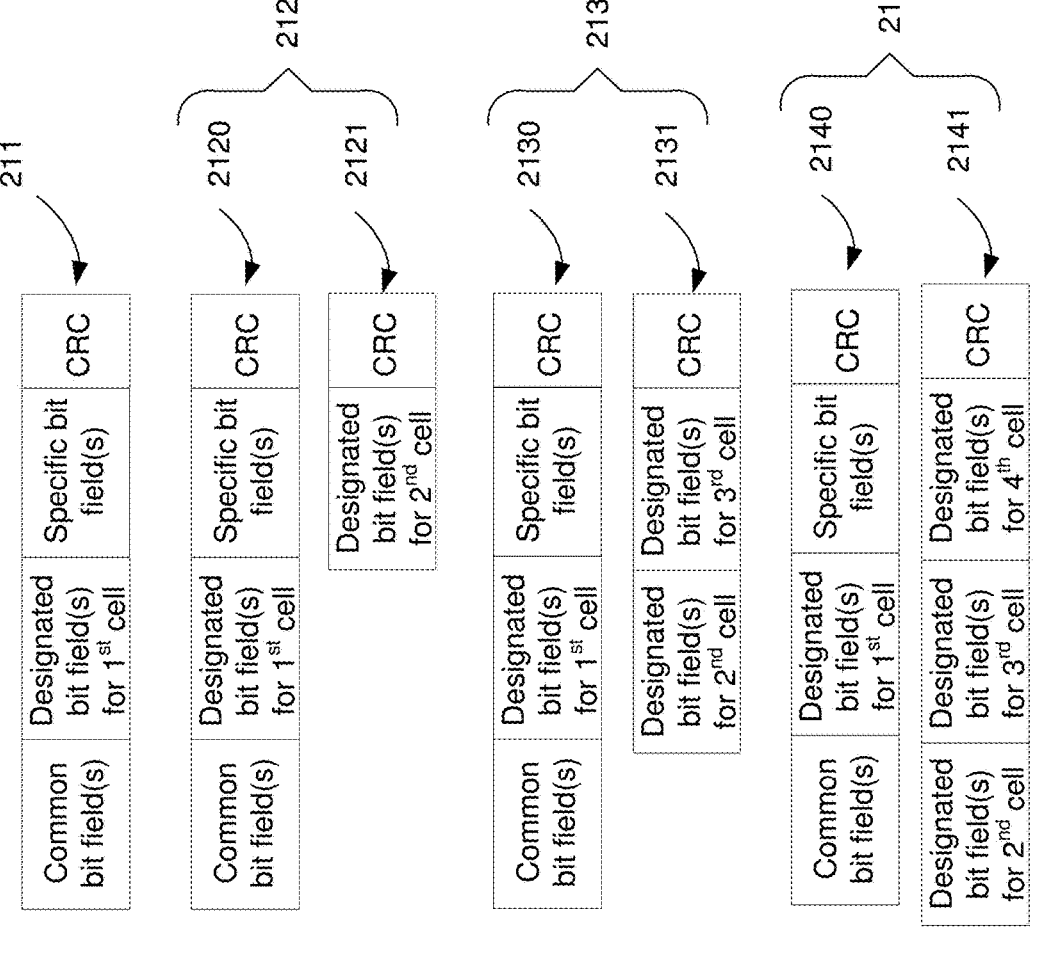
FIG. 2B is a diagram depicting another example scenario illustrating another DCI structure in accordance with the present disclosure.

FIG. 2A illustrates an example scenario 200 illustrating a DCI structure in accordance with implementations of the present disclosure, and FIG. 2B illustrates another example scenario 210 illustrating another DCI structure in accordance with implementations of the present disclosure. As shown in FIG. 2A and FIG. 2B, scenario 200 or scenario 210 being similar to scenario 100 may include at least one BS serving the UE with at least one cell (e.g., at least one of $1^{st}$ cell, $2^{nd}$ cell, $3^{rd}$ cell and $4^{th}$ cell), and the difference is that the BS in the scenario 200 or scenario 210 may configure a single DCI to the UE for its communication(s) with the at least one cell (e.g., at least one of $1^{st}$ cell, $2^{nd}$ cell, $3^{rd}$ cell and $4^{th}$ cell). If more than one cells are configured to the UE, the UE may receive the single DCI via one cell (e.g., $1^{st}$ cell), and the other cells (e.g., $2^{nd}$ cell, $3^{rd}$ cell and/or $4^{th}$ cell) are scheduled by the same single DCI received in the previous cell (e.g., $1^{st}$ cell). Since the UE may utilize one specific decoding technique (e.g., polar decoding technique) for decoding the single DCI, the network and/or the BS may adaptively configure a field number/size of the single DCI complying with the bit-limit rule (e.g., less than 140 bits).

In some implementations, based on the bit-limit rule, the single DCI may have two types of DCI structure, i.e., a one-segment DCI structure shown in FIG. 2A and a two-segment DCI structure shown in FIG. 2B. In one example, the one-segment DCI structure shown in FIG. 2A may be an aggregated DCI including a common bit field (e.g., including 24 bits), a first specific bit field (e.g., including less than 10 bits), at least one designated bit field (e.g., including 36 bits) corresponding to at least one cell (e.g., $1^{st}$ cell, $2^{nd}$ cell, $3^{rd}$ cell and/or 4th cell), and a CRC bit field (e.g., including 24 bits). Also, a number of bit field(s) of the common bit field, the first specific bit field and/or the designated bit field in FIG. 2A may be adaptively adjusted based on different requirements, i.e., more than one common bit fields and/or more than one specific bit fields may also be adopted into the one-segment DCI structure with the at least one designated bit field corresponding to at least one cell (e.g., $1^{st}$ cell, $2^{nd}$ cell, $3^{rd}$ cell and/or $4^{th}$ cell).

Specifically, the one-segment DCI structure may include four types based on a number of cell(s) configured by the BS to the UE. For example, the BS may transmit DCI 201 to configure one cell (e.g., $1^{st}$ cell) to the UE. Alternatively, the BS may transmit DCI 202 to configure two cells (e.g., $1^{st}$ cell and $2^{nd}$ cell) to the UE, or the BS may transmit DCI 203 to configure three cells (e.g., $1^{st}$ cell, $2^{nd}$ cell and $3^{rd}$ cell) to the UE, or the BS may transmit DCI 204 to configure four cells (e.g., $1^{st}$ cell, $2^{nd}$ cell, $3^{rd}$ cell and $4^{th}$ cell) to the UE.

As shown in FIG. 2B, the two-segment DCI structure shown may include one or more DCI segments based on a number of cell(s) configured to the UE. If only one cell is configured by the BS to the UE, DCI 211 shown in FIG. 2B may share a similar structure and compositions as the DCI 201 shown in FIG. 2A, i.e., the DCI 211 may include the common bit field (e.g., including 24 bits), a second specific bit field (e.g., including less than 10 bits), one designated bit field (e.g., including 36 bits) corresponding to one cell (e.g., $1^{st}$ cell), and a CRC bit field (e.g., including 24 bits).

If more than one cells are configured by the BS to the UE, the two-segment DCI structure (e.g., DCI 212, DCI 213 and DCI 214) shown in FIG. 2B may include two DCI segments (e.g., $1^{st}$ DCI segment and $2^{nd}$ DCI segment) that can be formed by adaptively dividing the one-segment DCI structure as two independent DCIs, and the UE may link both the two DCI segments together before deciding the DCI for scheduling information. Specifically, as shown in FIG. 2B, the two-segment DCI structure may include two DCI segments, where one DCI segment may include the common bit field (e.g., including 24 bits), the second specific bit field (e.g., including less than 10 bits), a first part of designated bit fields (e.g., each designated bit field including 36 bits) corresponding to at least one cell and the CRC bit field (e.g., including 24 bits), and the other DCI segment may include a second part of designated bit fields (e.g., each designated bit field including 36 bits) corresponding other cells and the CRC bit field (e.g., including 24 bits). Certainly, a number of bit field(s) of the common bit field, the second specific bit field and/or the designated bit field in FIG. 2B may be adaptively adjusted based on different requirements.

In one example, if two cells are configured to the UE, the DCI 212 may include two DCI segments 2120 and 2121, where the DCI segment 2120 may include the common bit field, the second specific bit field, the designated bit field corresponding to one cell (e.g., $1^{st}$ cell) and the CRC bit field, and the other DCI segment 2121 may include another designated bit field corresponding another cell (e.g., $2^{nd}$ cell) and the CRC bit field. If three cells are configured to the UE, the DCI 213 may include two DCI segments 2130 and 2131, where the DCI segment 2130 may include the common bit field, the second specific bit field, the designated bit field corresponding to one cell (e.g., $1^{st}$ cell) and the CRC bit field, and the other DCI segment 2131 may include the other designated bit fields corresponding the other cells (e.g., $2^{nd}$ cell and $3^{rd}$ cell) and the CRC bit field. If four cells are configured to the UE, the DCI 214 may include two DCI segments 2140 and 2141, where the DCI segment 2140 may include the common bit field, the second specific bit field, the designated bit field corresponding to one cell (e.g., $1^{st}$ cell) and the CRC bit field, and the other DCI segment 2141 may include the other designated bit fields corresponding the other cells (e.g., $2^{nd}$ cell, $3^{rd}$ cell and $4^{th}$ cell) and the CRC bit field.

In other words, a first part of bit fields of the one-segment DCI structure (e.g., DCI 201, DCI 202, DCI 203 and DCI 204 in FIG. 2A) and/or the two-segment DCI structure (e.g., DCI 211, DCI 212, a DCI 213 and a DCI 214 in FIG. 2B) may be defined as the common bit field, and a second part of bit fields of the one-segment DCI structure (e.g., DCI 201, DCI 202, DCI 203 and DCI 204 in FIG. 2A) and/or the two-segment DCI structure (e.g., DCI 211, DCI 212, a DCI 213 and a DCI 214 in FIG. 2B) may be configured as the common bit field or the designated bit field(s), where a number of bit field(s) of the common bit field and/or the designated bit field may also be adjusted. Specifically, the BS may transmit a radio resource control (RRC) configuration to the UE, to configure which bit field of the one-segment DCI structure (e.g., DCI 201, DCI 202, DCI 203 and DCI 204 in FIG. 2A) and/or the two-segment DCI structure (e.g., DCI 211, DCI 212, a DCI 213 and a DCI 214 in FIG. 2B) to be the common bit field or to be the designated bit field(s).

In some embodiments, complying with the bit-limit rule, the two-segment DCI structure (e.g., DCI 211, DCI 212, a DCI 213 and a DCI 214 in FIG. 2B) may adaptively adjust a number of designated bit field(s) including in either one of the $1^{st}$ DCI segment and $2^{nd}$ DCI segment if more than two cells are configured to the UE. For example, if four cells (e.g., $1^{st}$ cell, $2^{nd}$ cell, $3^{rd}$ cell and $4^{th}$ cell) are configured to the UE, one DCI segment (e.g., $1^{st}$ DCI segment) may include the common bit field, the second specific bit field, two designated bit fields corresponding to two cells (e.g., $1^{st}$ cell and $2^{nd}$ cell) and the CRC bit field, and the other DCI segment (e.g., $2^{nd}$ DCI segment) may include two designated bit fields corresponding to the other two cells (e.g., $3^{rd}$ cell and $4^{th}$ cell) and the CRC bit field.

In some embodiments, a bit field order of the one-segment DCI structure (e.g., DCI 201, DCI 202, DCI 203 and DCI 204 in FIG. 2A) and/or the two-segment DCI structure (e.g., DCI 211, DCI 212, a DCI 213 and a DCI 214 in FIG. 2B) may also be adaptively adjusted based on different decoding techniques or mapping requirements. In other words, the common bit field, the designated bit field and the specific bit fields corresponding to different cells may adaptively change their bit field order allocated inside the DCI based on different decoding techniques or mapping requirements.

In some embodiments, the first specific bit field of the one-segment DCI structure (e.g., DCI 201, DCI 202, DCI 203 and DCI 204 in FIG. 2A) and/or the second specific bit field of the two-segment DCI structure (e.g., DCI 211, DCI 212, a DCI 213 and a DCI 214 in FIG. 2B) may include a bitmap that indicates a scheduling information of a plurality of cells, and a size of the bitmap indicates a number of cells scheduled by the DCI. For example, the size of the DCI segment 2140 of the DCI 214 in FIG. 2B may be four to indicate four cells (e.g., $1^{st}$ cell, $2^{nd}$ cell, $3^{rd}$ cell and $4^{th}$ cell) being simultaneously configured to the UE via the two DCI segments (e.g., DCI segments 2140 and 2141).

Figure 3:
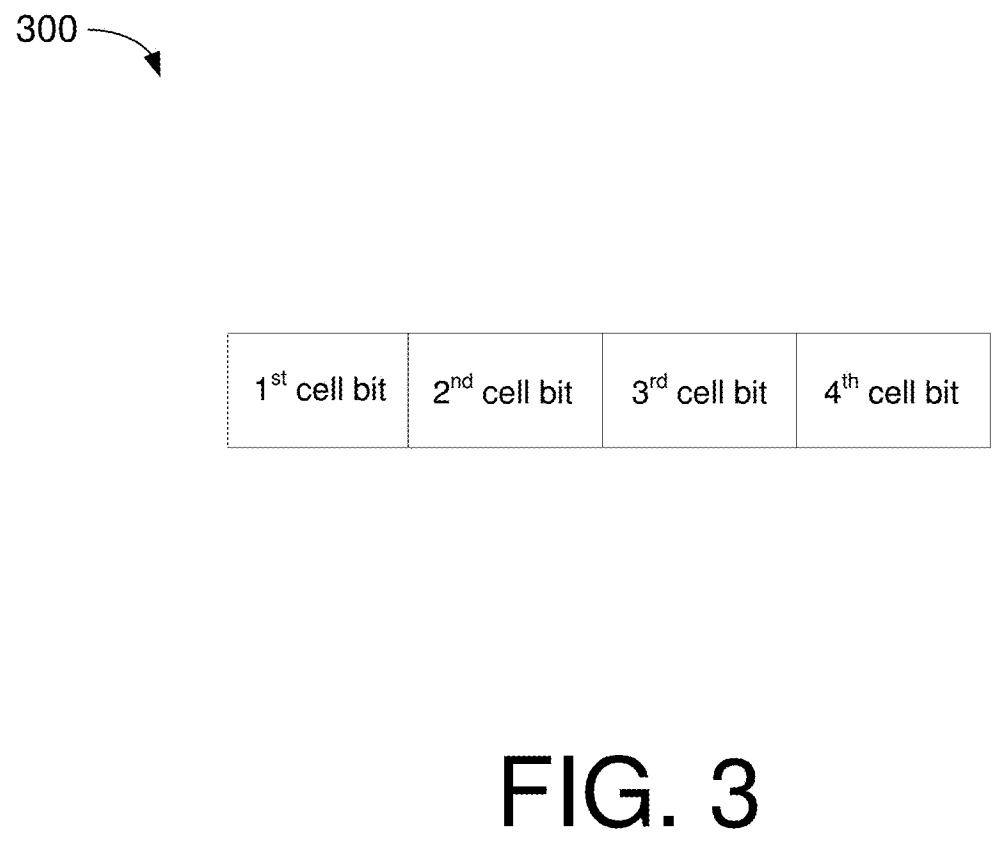

FIG. 3 illustrates an example illustrating a bitmap 300 of a specific bit field in a DCI in accordance with implementations of the present disclosure. In one example, the BS may configure four cells to the UE in the bitmap 300, and there may be four bit fields corresponding to the four cells (e.g., $1^{st}$ cell, $2^{nd}$ cell, $3^{rd}$ cell and $4^{th}$ cell) in the bitmap 300. If the BS simultaneously configures multiple cells to the UE in the one-segment DCI structure, all the scheduling information may be configured by the first specific bit field of the single DCI (e.g., DCI 201, DCI 202, DCI 203 and DCI 204 in FIG. 2A). Alternatively, if the BS simultaneously configures multiple cells to the UE in the two-segment DCI structure, all the scheduling information may be configured by the second specific bit field of the $1^{st}$ DCI segment (e.g., DCI 211, DCI 2120, DCI 2130 and DCI 2140 in FIG. 2B) of the two-segment DCI structure.

Based on simultaneously configuring four cells to the UE in the two-segment DCI structure, if a sequence of the bitmap 300 includes one bit (e.g., only an '1' value in the specific bit field), the UE may be indicated that the BS may only transmit a $1^{st}$ DCI segment (e.g., DCI segment 2140 in FIG. 2B) and may not transmit another $2^{nd}$ DCI segment (e.g., DCI segment 2141 in FIG. 2B). In other words, if the bitmap 300 only includes an '1', the DCI may have a $1^{st}$ DCI segment (e.g., DCI segment 2140 in FIG. 2B) that is similar to the one-segment DCI structure (e.g., DCI 204 in FIG. 2A).

In some implementations, if the BS configures a DCI that is the two-segment DCI structure to configure a plurality of cells (e.g., configuring four cells as $1^{st}$ cell, $2^{nd}$ cell, $3^{rd}$ cell and $4^{th}$ cell) to the UE, one scheduled cell with a lowest cell index may be indicated by a $1^{st}$ DCI segment (e.g., DCI segment 2140 in FIG. 2B), and the other of the plurality of scheduled cells may be indicated by a $2^{nd}$ DCI segment (e.g., DCI segment 2141 in FIG. 2B). For example, if the four scheduled cells have their ServCellIndex values (e.g., setting ServCellIndex values to be '1', '2', '3' and '4' corresponding to $1^{st}$ cell, $2^{nd}$ cell, $3^{rd}$ cell and $4^{th}$ cell, respectively), one cell having the lowest cell index (e.g., ServCellIndex value '1' corresponding to $1^{st}$ cell) may be configured by the $1^{st}$ DCI segment (e.g., DCI segment 2140 in FIG. 2B), and the other cells (e.g., ServCellIndex values '2', '3' and '4' corresponding to $2^{nd}$ cell, $3^{rd}$ cell and $4^{th}$ cell, respectively) may be configured by the $2^{nd}$ DCI segment (e.g., DCI segment 2141 in FIG. 2B).

As shown in FIG. 3, if at least two of the four bit fields corresponding to the four cells (e.g., $1^{st}$ cell, $2^{nd}$ cell, $3^{rd}$ cell and $4^{th}$ cell) of the bitmap 300 are indicated '1' (e.g., $2^{nd}$ cell bit and $3^{rd}$ cell bit), the cell with the lowest cell index (e.g., '1' in $2^{nd}$ cell bit) may be configured by the $1^{st}$ DCI segment (e.g., DCI segment 2140 in FIG. 2B), and the other cell(s) with its cell index (e.g., '1' in $3^{rd}$ cell bit) may be configured by the $2^{nd}$ DCI segment (e.g., DCI segment 2141 in FIG. 2B).

In some embodiments, based on the two-segment DCI structure, the BS may configure an additional DCI bit or an RRC configuration to the UE, so as to indicate utilizing/ existing of the $2^{nd}$ DCI segment (e.g., DCI segment 2121, 2131 or 2141 in FIG. 2B) for the UE. In one example, the additional DCI bit may be included in the $1^{st}$ DCI segment (e.g., DCI segment 2120, 2130 or 2140 in FIG. 2B), or in the $2^{nd}$ DCI segment (e.g., DCI segment 2121, 2131 or 2141 in FIG. 2B). Alternatively, the BS may configure a new DCI to carry the additional DCI bit to the UE.

In some embodiments, based on four cells configuration of the UE, after the UE receives two DCI segments from the BS, the UE may determine whether the two DCI segments are received from one cell as well as in a same time duration (e.g., in a same slot or in a same symbol). If the two DCI segments are received from the same cell as well as in the same time duration, the UE may determine that the two segments are associated to each other (e.g., DCI segment 2140 and DCI segment 2141 in FIG. 2B). Next, the UE may link the two DCI segments (e.g., DCI segment 2140 and DCI segment 2141 in FIG. 2B) to obtain the single and integral DCI, so as to decode the scheduling information for the four cells. In addition, the UE may further determine whether the two segments are both downlink (DL) scheduling DCI or uplink (UL) scheduling DCI before decoding. If the two DCI segments are both associated with the DL scheduling DCI or associated with the UL scheduling DCI, the UE may further determine that the two DCI segments are associated to each other (e.g., DCI segment 2140 and DCI segment 2141 in FIG. 2B), and it is allowable to combine the two DCI segments (e.g., DCI segment 2140 and DCI segment 2141 in FIG. 2B), so as to obtain the single and integral DCI for decoding the scheduling information of the four cells.

In some embodiments, for the one-segment DCI structure or the two-segment DCI structure configuring a plurality of cells, the UE may determine a DCI size budget of the DCI counted in one of the plurality of cells (e.g., one scheduling cell or one non-scheduling cell), so as to reduce UE burdens and simplify computing/waiting period of the network. After determining the DCI size budget of the single DCI, the UE may perform a DCI decoding according to the DCI size budget.

In some embodiments, based on multiple-cell configuration in a DCI, if the DCI is the one-segment DCI structure to configure a first number of the plurality of cells to the UE, the UE may perform the DCI decoding according to a first decoding size for the DCI, where the first decoding size is determined according to the first number of the plurality of cells. In other words, the UE may apply the DCI decoding with the same size if the same number of cells are scheduled. In addition, the BS may pad one or more '0' to the DCI for complying with the same decoding size (i.e., first decoding size) if the same number of cells are scheduled by the DCI.

In some embodiments, if the DCI is the two-segment DCI structure to configure a second number of the plurality of cells to the UE, the UE may perform the DCI decoding according to a second decoding size for the DCI. The second decoding size may have four combinations based on a number of cells being configured to the UE, and the BS may adaptively pad one or more '0' to the DCI for complying with the same decoding size (i.e., second decoding size) if the same number of cells are scheduled by the DCI.

For introducing the four combinations with the two-segment DCI structure, if one cell is configured to the UE, the $1^{st}$ DCI segment (e.g., DCI 211 in FIG. 2B) may be a non-fallback size (e.g., a Long format). If two cells are configured to the UE, the $1^{st}$ DCI segment (e.g., DCI 2120 in FIG. 2B) may be a non-fallback size (e.g., a Long format) and the $2^{nd}$ DCI segment (e.g., DCI 2121 in FIG. 2B) may be a fallback size (e.g., a Short format). If three cells are configured to the UE, the $1^{st}$ DCI segment (e.g., DCI 2130 in FIG. 2B) may be a non-fallback size (e.g., a Long format) and the $2^{nd}$ DCI segment (e.g., DCI 2131 in FIG. 2B) may be a non-fallback size (e.g., a Long format). If four cells are configured to the UE, the $1^{st}$ DCI segment (e.g., DCI 2140 in FIG. 2B) may be a non-fallback size (e.g., a Long format) and the $2^{nd}$ DCI segment (e.g., DCI 2141 in FIG. 2B) may be a 3-cell segment size (e.g., an Ultra Long format).

In some embodiments, for the one-segment DCI structure or the two-segment DCI structure configuring a plurality of cells, the UE may determine a blind decoding (BD) or control channel element (CCE) budget counted in one of the plurality of cells. Then, the UE may perform the DCI decoding according to the BD or CCE budget. As that, by utilizing the BD or CCE budget for the UE performing the DCI decoding, the UE may efficiently reduce its complexity while receiving the multi-cell scheduling DCI.

In some embodiments, if the BS configure the one-segment DCI structure to the UE for scheduling a plurality of cells, the UE may determine the BD or CCE budget by multiplying a pre-defined BD or CCE budget by a first scaling number. The first scaling number is no less than 1 and no more than a number of the plurality of cells. Specifically, if each scheduled cell has a sub-carrier space (SCS) as $\mu$, the number of the plurality of co-scheduled cells is N and the UE may monitor at a slot for a physical downlink control channel (PDCCH), the pre-defined BD or CCE budget is min $$\left(M_{PDCCH}^{max,slot,\mu}, M_{PDCCH}^{total,slot,\mu}\right),$$

the UE may determine the BD or CCE budget to be $$M * \min\left(M_{PDCCH}^{max,slot,\mu}, M_{PDCCH}^{total,slot,\mu}\right),$$

where the first scaling number is M with $1 \leq M \leq N$. In addition, the BS may configure the BD or CCE budget to the UE via a dedicated/specific signaling, and the first scaling number is pre-determined or configured by the BS.

In some embodiments, if the BS configure the two-segment DCI structure to the UE for scheduling a plurality of cells, the UE may determine the BD or CCE budget for the $1^{st}$ DCI segment by multiplying the pre-defined BD or CCE budget by a second scaling number as well as determine the BD or CCE budget for the $2^{nd}$ DCI segment by multiplying the pre-defined BD or CCE budget by a third scaling number. The second scaling number is no more than the number of the plurality of cells, and the third scaling number is no more than the number of the plurality of cells. Specifically, if each scheduled cell has the SCS as $\mu$, the number of the plurality of co-scheduled cells is N, the UE may monitor at a slot for a PDCCH, and the pre-defined BD or CCE budget is $$\min\left(M_{PDCCH}^{max,slot,\mu}, M_{PDCCH}^{total,slot,\mu}\right),$$

the UE may determine the BD or CCE budget for the $1^{st}$ DCI segment to be $$\alpha_1 * \min\left(M_{PDCCH}^{max,slot,\mu}, M_{PDCCH}^{total,slot,\mu}\right)$$

as well as determine the BD or CCE budget for the $2^{nd}$ DCI segment to be $$\alpha_2 * \min\left(M_{PDCCH}^{max,slot,\mu}, M_{PDCCH}^{total,slot,\mu}\right),$$

where the second scaling number is $\alpha_1$ with $\alpha_1 \leq N$, the third scaling number is $\alpha_2$ with $\alpha_2 \leq N$. Also, for determining the BD or CCE budget for the $1^{st}$ DCI segment/$2^{nd}$ DCI segment, it is proposed $\alpha_2 \leq \alpha_1$ to avoid error propagation. In addition, the BS may configure the BD or CCE budget to the UE via a dedicated/specific signaling, and the second scaling number or the third scaling number is pre-determined or configured by the BS.

In some embodiments, the UE may transmit a capability report to the BS to indicate a maximum number of cells that can be simultaneously scheduled. In other words, the UE may report its capability to the BS for indicating the maximum number of cells that can be supported by the UE. As that, the BS may correspondingly configure one or multiple cells with a number of co-scheduled cells to the UE for simultaneous transmission between the UE and the BS, and the number of co-scheduled cells may be smaller than or equal to the maximum number of cells. Based on different transmission criteria, the BS may adaptively configure the number of co-scheduled cells to the UE, and the configured number of co-scheduled cells may not be larger than the maximum number of cells.

In some embodiments, for multi-cell scheduling/transmission, the BS may configure a configuration of a plurality of cell sets to the UE. As that, the UE may receive the configuration of the plurality of cell sets for multi-cell scheduling in one cell group, and each of the plurality of cell sets may include at least one cell that can be simultaneously scheduled for the UE. In other words, if the BS adaptively configures the plurality of cell sets to the UE in one cell group and there are four cells in each of the cell sets, the UE may select one of the cell sets and simultaneously perform multi-cell transmission with the four cells within the selected cell set.

In some embodiments, for the one-segment DCI structure or the two-segment DCI structure configuring a plurality of cells, the BS may configure a CCE index of a search space for the DCI according to a cell set index, and the UE may determine the CCE index of the search space for the DCI according to the cell set index that is configured by the BS. Specifically, the cell set index and/or the CCE index may correspond to one of the plurality of cell sets, the cell set index $n_{CI}$ may be configured as different values for different cell set, respectively, (e.g., $n_{CI}=1$ for $1^{st}$ cell set, $n_{CI}=2$ for $2^{nd}$ cell set, etc.) and the CCE index may be specified by the formula as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i'',$$

where 's' is a search space set, 'p' is a control resource set (CORESET), 'L' is an aggregation level, $m_{s,n_{CI}}$ is a PDCCH candidate, $$n_{s,f}^{\mu}$$

is a slot for an active DL bandwidth part (BWP) of a serving cell.

While applying the above formula for the two-segment DCI structure, the cell set index $n_{CI}$ may be zero for the $1^{st}$ DCI segment. For the $2^{nd}$ DCI segment, a corresponding RRC configuration may be utilized to replace the cell set index $n_{CI}$, and the corresponding RRC may be a parameter SearchSpace or a predefined number from the BS.

As that, the search space for the DCI corresponding to the plurality of cell sets may be adaptively staggered by utilizing the above cell set index and/or CCE index configured by the BS. In some embodiments, based on the one-segment DCI structure, the UE may receive a plurality of DCIs corresponding to the plurality of cell sets, and the plurality of DCIs may be transmitted with different CCE indexes in a frequency domain for the UE monitoring.

Figure 4:
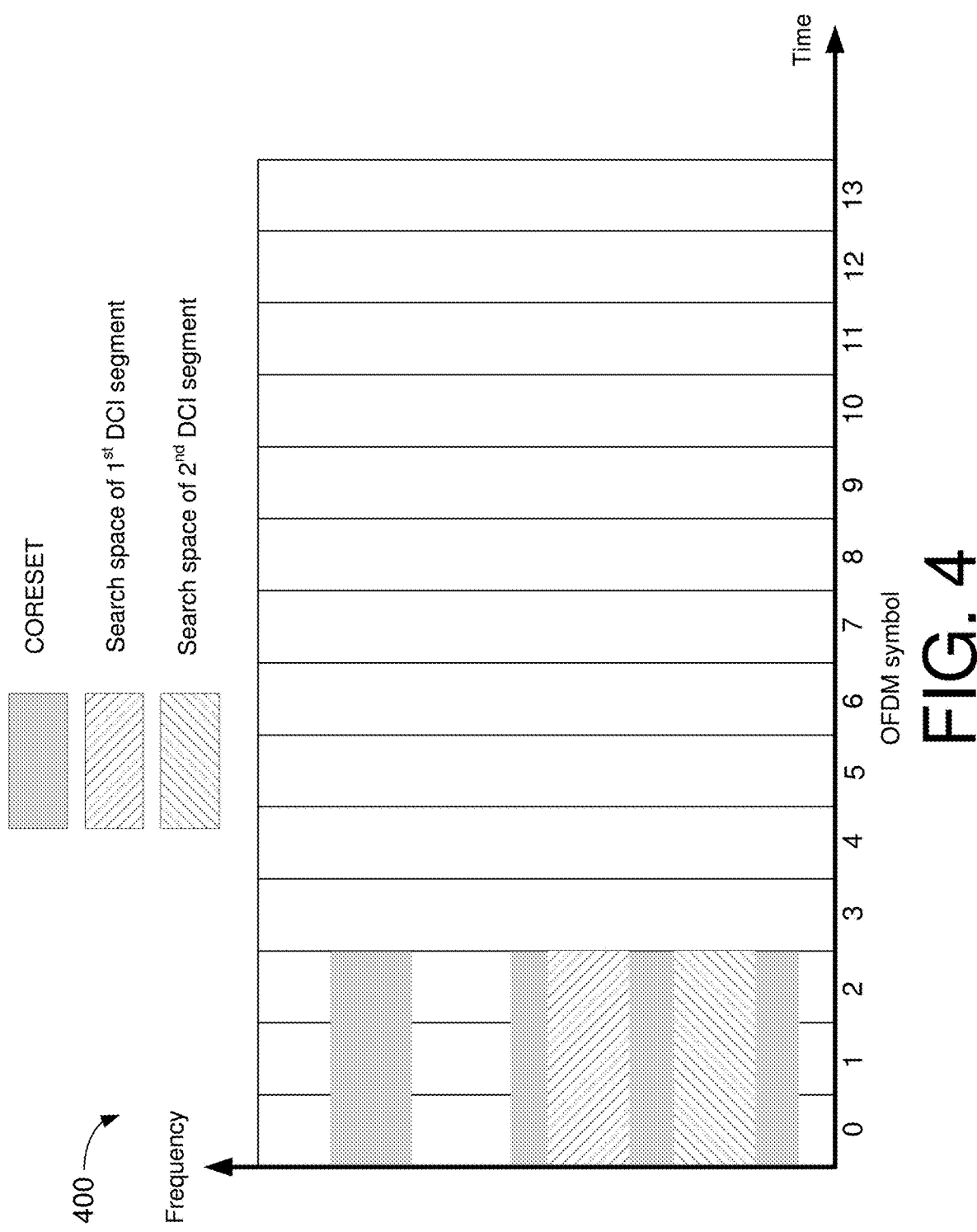
FIG. 4 is a diagram depicting an example illustrating a staggered search space in accordance with implementations of the present disclosure.
Figure 5:
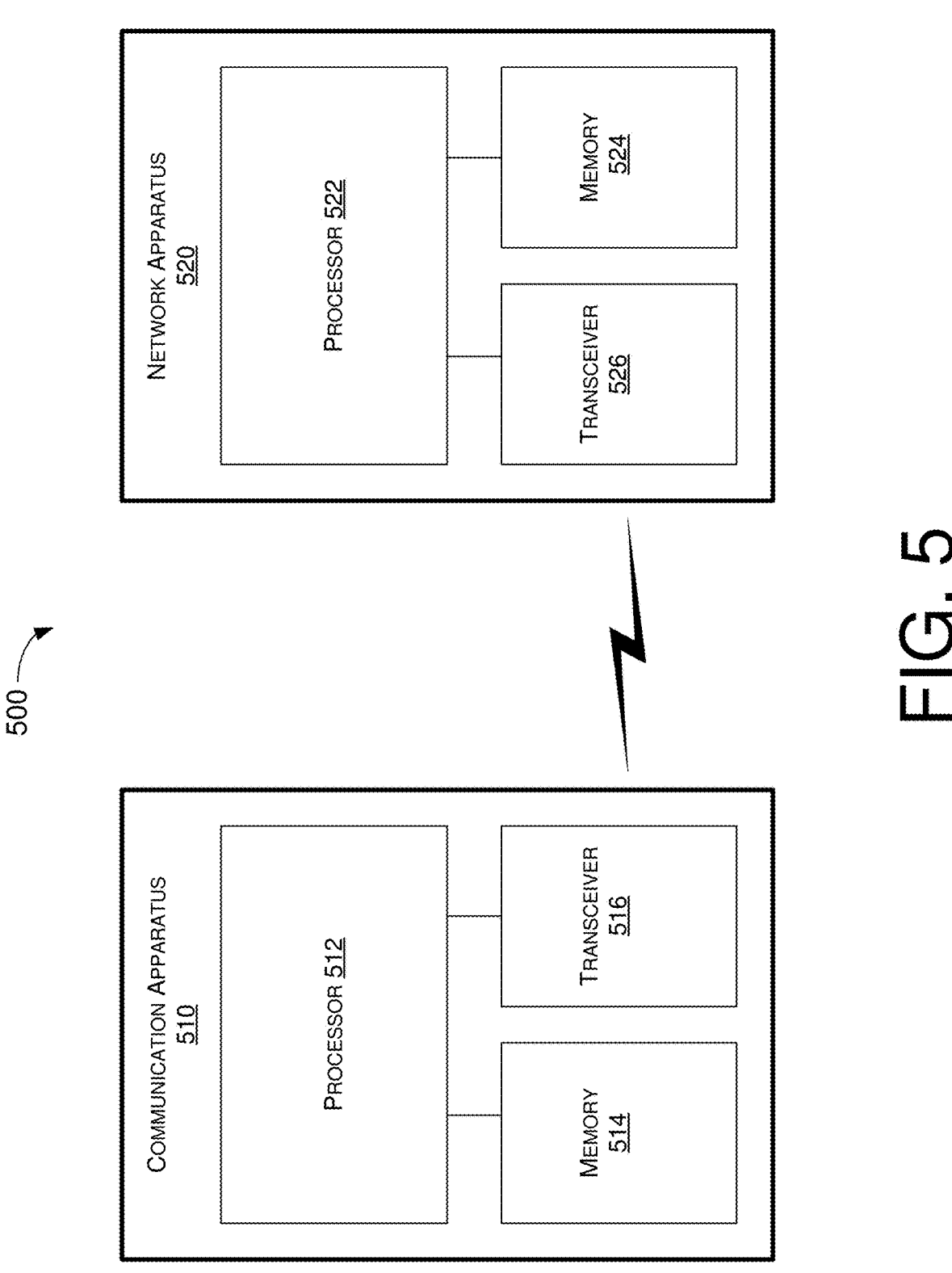
FIG. 5 is a block diagram of an example communication system in accordance with an implementation of the present disclosure.

FIG. 4 illustrates an example illustrating a staggered search space 400 in accordance with implementations of the present disclosure. As shown in FIG. 4, after receiving an RRC indicating that the $2^{nd}$ DCI segment is existed and configured to the UE, the BS may apply one additional information element (IE) SegmentId under the parameter SearchSpace to specify which search space is for the $1^{st}$ DCI segment and which search space is for the $2^{nd}$ DCI segment. In other words, the BS and/or the network may ensure that the two search spaces for the $1^{st}$ DCI segment and for the $2^{nd}$ DCI segment are not overlapped to avoid ambiguity for distinguishing the two DCI segments. In addition, the BS may apply the cell set index $n_{CI}$ as well as the IE SegmentId under the parameter SearchSpace to specify which search space is for the $1^{st}$ DCI segment or for the $2^{nd}$ DCI segment. Illustrative Implementations FIG. 5 illustrates an example communication system 500 having an example communication apparatus 510 and an example network apparatus 520 in accordance with an implementation of the present disclosure. Each of communication apparatus 510 and network apparatus 520 may perform various functions to implement schemes, techniques, processes and methods described herein pertaining to improvement of a scheduling of multi-cell PUSCH/PDSCH transmission with a single DCI, including scenarios/schemes described above as well as processes 600 to 1300 described below.

Communication apparatus 510 may be a part of an electronic apparatus, which may be a UE such as a portable or mobile apparatus, a wearable apparatus, a wireless communication apparatus or a computing apparatus. For instance, communication apparatus 510 may be implemented in a smartphone, a smartwatch, a personal digital assistant, a digital camera, or a computing equipment such as a tablet computer, a laptop computer or a notebook computer. Communication apparatus 510 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 510 may be implemented in a smart thermostat, a smart fridge, a smart door lock, a wireless speaker or a home control center. Alternatively, communication apparatus 510 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 510 may include at least some of those components shown in FIG. 5 such as a processor 512, for example. Communication apparatus 510 may further include one or more other components not pertinent to the proposed scheme of the present disclosure (e.g., internal power supply, display device and/or user interface device), and, thus, such component(s) of communication apparatus 510 are neither shown in FIG. 5 nor described below in the interest of simplicity and brevity.

Network apparatus 520 may be a part of an electronic apparatus, which may be a network node such as a base station, a small cell, a router or a gateway. For instance, network apparatus 520 may be implemented in an eNodeB in an LTE, LTE-Advanced or LTE-Advanced Pro network or in a gNB in a 5G, NR, IoT, NB-IoT or IIoT network. Alternatively, network apparatus 520 may be implemented in the form of one or more IC chips such as, for example and without limitation, one or more single-core processors, one or more multi-core processors, or one or more RISC or CISC processors. Network apparatus 520 may include at least some of those components shown in FIG. 5 such as a processor 522, for example. Network apparatus 520 may further include one or more other components not pertinent to the proposed scheme of the present disclosure (e.g., internal power supply, display device and/or user interface device), and, thus, such component(s) of network apparatus 520 are neither shown in FIG. 5 nor described below in the interest of simplicity and brevity.

In one aspect, each of processor 512 and processor 522 may be implemented in the form of one or more single-core processors, one or more multi-core processors, or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including autonomous reliability enhancements in a device (e.g., as represented by communication apparatus 510) and a network (e.g., as represented by network apparatus 520) in accordance with various implementations of the present disclosure.

In some implementations, communication apparatus 510 may also include a transceiver 516 coupled to processor 512 and capable of wirelessly transmitting and receiving data. In some implementations, communication apparatus 510 may further include a memory 514 coupled to processor 512 and capable of being accessed by processor 512 and storing data therein. In some implementations, network apparatus 520 may also include a transceiver 526 coupled to processor 522 and capable of wirelessly transmitting and receiving data. In some implementations, network apparatus 520 may further include a memory 524 coupled to processor 522 and capable of being accessed by processor 522 and storing data therein. Accordingly, communication apparatus 510 and network apparatus 520 may wirelessly communicate with each other via transceiver 516 and transceiver 526, respectively. To aid better understanding, the following description of the operations, functionalities and capabilities of each of communication apparatus 510 and network apparatus 520 is provided in the context of a mobile communication environment in which communication apparatus 510 is implemented in or as a communication apparatus or a UE and network apparatus 520 is implemented in or as a network node of a communication network.

In some implementations, processor 512 may receive, via transceiver 516, a DCI scheduling a plurality of cells from the network apparatus 520, wherein the DCI includes at least one of a first DCI, a second DCI, and a third DCI, the first DCI corresponds to a one-segment DCI structure, and the second DCI and the third DCI correspond to a two-segment DCI structure. Then, processor 512 may perform a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, a first part of bit fields of the first DCI, the second DCI or the third DCI are defined as the common bit field, and a second part of bit fields of the first DCI, the second DCI or the third DCI are configured as the common bit field or the designated bit fields.

In some implementations, processor 512 may receive, via transceiver 516, an RRC configuration to configure which bit field of the first DCI, the second DCI or the third DCI to be the common bit field or to be the designated bit fields.

In some implementations, the first specific bit field or the second specific bit field includes a bitmap indicating a scheduling information of the plurality of cells. A size of the bitmap indicates a number of cells scheduled by the DCI. In an event that a sequence of the bitmap includes only one bit value, the DCI includes the first DCI. In an event that the DCI comprises the second DCI and the third DCI to indicate a plurality of scheduled cells for the apparatus, one scheduled cell with a lowest cell index is indicated by the second DCI, and the other of the plurality of scheduled cells are indicated by the third DCI.

In some implementations, processor 512 may determine that the DCI includes the second DCI or the third DCI according to an additional DCI bit or an RRC configuration.

In some implementations, processor 512 may link the second DCI and the third DCI after determining that the second DCI and the third DCI are received from one cell in a same time duration. Both the second DCI and the third DCI are DL scheduling DCI, or both the second DCI and the third DCI are UL scheduling DCI.

In some implementations, processor 522 may configure a DCI scheduling a plurality of cells. The DCI includes at least one of a first DCI, a second DCI, and a third DCI, the first DCI corresponds to a one-segment DCI structure, and the second DCI and the third DCI correspond to a two-segment DCI structure in a SIB. Then, processor 522 may transmit, via transceiver 526, the DCI to the communication apparatus 510 to schedule a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, a first part of bit fields of the first DCI, the second DCI or the third DCI are defined as the common bit field, and a second part of bit fields of the first DCI, the second DCI or the third DCI are configured as the common bit field or the designated bit fields.

In some implementations, processor 522 may configure an RRC configuration to the communication apparatus 510 to indicate which bit field of the first DCI, the second DCI or the third DCI to be the common bit field or to be the designated bit fields.

In some implementations, the first specific bit field or the second specific bit field includes a bitmap indicating a scheduling information of the plurality of cells. A size of the bitmap indicates a number of cells scheduled by the DCI. In an event that a sequence of the bitmap includes only one bit value, the DCI includes the first DCI. In an event that the DCI includes the second DCI and the third DCI to indicate a plurality of scheduled cells for the apparatus, one scheduled cell with a lowest cell index is indicated by the second DCI, and the other of the plurality of scheduled cells are indicated by the third DCI.

In some implementations, processor 522 may indicate that the DCI includes the second DCI or the third DCI by an additional DCI bit or an RRC configuration.

In some implementations, processor 512 may receive, via transceiver 516, a DCI scheduling a plurality of cells from the network apparatus 520, wherein the DCI includes at least one of a first DCI, a second DCI, and a third DCI, the first DCI corresponds to a one-segment DCI structure, and the second DCI and the third DCI correspond to a two-segment DCI structure. Then, processor 512 may determine a DCI size budget of the DCI counted in one of the plurality of cells. Further, the processor 512 may perform a DCI decoding according to the DCI size budget and perform a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, processor 512 may perform the DCI decoding according to a first decoding size for the DCI in an event that the DCI includes the first DCI to configure a first number of the plurality of cells, wherein the first decoding size is determined according to the first number of the plurality of cells.

In some implementations, processor 512 may perform the DCI decoding according to a second decoding size for the DCI in an event that the DCI includes the second DCI and the third DCI to configure a second number of the plurality of cells, wherein the second decoding size includes four combinations. The second DCI includes a non-fallback size in an event that one cell is configured to the apparatus, the second DCI includes a non-fallback size and the third DCI includes a fallback size in an event that two cells are configured to the apparatus, both the second DCI and the third DCI include a non-fallback size in an event that three cells are configured to the apparatus, and the second DCI includes a non-fallback size and the third DCI includes a 3-cell segment size in an event that four cells are configured to the apparatus.

In some implementations, processor 512 may receive, via transceiver 516, a DCI scheduling a plurality of cells from the network apparatus 520, wherein the DCI includes at least one of a first DCI, a second DCI, and a third DCI, the first DCI corresponds to a one-segment DCI structure, and the second DCI and the third DCI correspond to a two-segment DCI structure. Then, processor 512 may determine a BD or CCE budget counted in one of the plurality of cells. Further, the processor 512 may perform a DCI decoding according to the BD or CCE budget and perform a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, processor 512 may determine the BD or CCE budget by multiplying a pre-defined BD or CCE budget by a first scaling number in an event that the DCI includes the first DCI, wherein the first scaling number is no less than 1 and no more than a number of the plurality of cells.

In some implementations, processor 512 may determine the BD or CCE budget by multiplying the pre-defined BD or CCE budget by a second scaling number in an event that the DCI includes the second DCI, wherein the second scaling number is no more than the number of the plurality of cells.

In some implementations, processor 512 may determine the BD or CCE budget by multiplying the pre-defined BD or CCE budget by a third scaling number in an event that the DCI includes the third DCI, wherein the third scaling number is no more than the number of the plurality of cells.

In some implementations, the first scaling number, the second scaling number or the third scaling number is predetermined or configured by the network apparatus 520.

In some implementations, the second scaling number is greater than the third scaling number.

In some implementations, processor 522 may configure a DCI scheduling a plurality of cells. The DCI includes at least one of a first DCI, a second DCI, and a third DCI, the first DCI corresponds to a one-segment DCI structure, and the second DCI and the third DCI correspond to a two-segment DCI structure in a SIB. Then, processor 522 may configure a DCI size budget of the DCI counted in one of the plurality of cells to the communication apparatus 510. Further, processor 522 may transmit, via transceiver 526, the DCI to the communication apparatus 510 to schedule a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, processor 522 may configure a DCI scheduling a plurality of cells. The DCI includes at least one of a first DCI, a second DCI, and a third DCI, the first DCI corresponds to a one-segment DCI structure, and the second DCI and the third DCI correspond to a two-segment DCI structure in a SIB. Then, processor 522 may configure a BD or CCE budget counted in one of the plurality of cells to the communication apparatus 510. Further, the processor 522 may transmit, via transceiver 526, the DCI to the communication apparatus 510 to schedule a PDSCH reception or a PUSCH transmission with at least one of the plurality of cells based on the DCI. The first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, the processor 522 may configure the BD or CCE budget by multiplying a pre-defined BD or CCE budget by a first scaling number in an event that the DCI includes the first DCI, wherein the first scaling number is no less than 1 and no more than a number of the plurality of cells.

In some implementations, the processor 522 may configure the BD or CCE budget by multiplying the pre-defined BD or CCE budget by a second scaling number in an event that the DCI includes the second DCI, wherein the second scaling number is no more than the number of the plurality of cells.

In some implementations, the processor 522 may configure the BD or CCE budget by multiplying the pre-defined BD or CCE budget by a third scaling number in an event that the DCI includes the third DCI, wherein the third scaling number is no more than the number of the plurality of cells.

In some implementations, the first scaling number, the second scaling number or the third scaling number is predetermined or configured by the network node.

In some implementations, the second scaling number is greater than the third scaling number.

In some implementations, processor 512 may transmit, via transceiver 516, a capability report to a network apparatus 520 of a wireless network to indicate a maximum number of cells that can be simultaneously scheduled. Then, processor 512 may receive, via transceiver 516, a DCI scheduling one or multiple cells with a number of co-scheduled cells being smaller than or equal to the maximum number of cells, wherein the DCI includes at least one of a first DCI, a second DCI, and a third DCI, the first DCI corresponds to a one-segment DCI structure, and the second DCI and the third DCI correspond to a two-segment DCI structure. Further, processor 512 may perform a PDSCH reception or a PUSCH transmission with at least one of the number of co-scheduled cells based on the DCI. The first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In some implementations, processor 512 may receive, via transceiver 516, a configuration of a plurality of cell sets for multi-cell scheduling in one cell group, wherein each of the plurality of cell sets includes at least one cell that can be simultaneously scheduled.

In some implementations, processor 512 may determine a CCE index of a search space for the DCI according to a cell set index.

In some implementations, the cell set index is configured by the network apparatus 520 corresponding to one of the plurality of cell sets.

In some implementations, processor 512 may receive, via transceiver 516, a plurality of DCIs corresponding to the plurality of cell sets, wherein each of the plurality of DCIs includes the first DCI.

In some implementations, the plurality of DCIs are transmitted with different CCE indexes in a frequency domain.

In some implementations, processor 522 may receive, via transceiver 526, a capability report from a communication apparatus 510 of a wireless network to indicate a maximum number of cells that can be simultaneously scheduled for the communication apparatus 510. Then, processor 522 may configure a DCI scheduling one or multiple cells with a number of co-scheduled cells being smaller than or equal to the maximum number of cells. The DCI includes at least one of a first DCI, a second DCI, and a third DCI, the first DCI corresponds to a one-segment DCI structure, and the second DCI and the third DCI correspond to a two-segment DCI structure. Further, processor 522 may transmit, via transceiver 526, the DCI to the communication apparatus 510 to schedule a PDSCH reception or a PUSCH transmission with at least one of the number of co-scheduled cells based on the DCI. The first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In some implementations, processor 522 may configure a configuration of a plurality of cell sets for multi-cell scheduling in one cell group, wherein each of the plurality of cell sets includes at least one cell that can be simultaneously scheduled.

In some implementations, processor 522 may configure a CCE index of a search space for the DCI according to a cell set index. Further, processor 522 may configure the cell set index that corresponds to one of the plurality of cell sets.

In some implementations, processor may transmit, via transceiver 526, a plurality of DCIs corresponding to the plurality of cell sets, wherein each of the plurality of DCIs includes the first DCI. The plurality of DCIs are transmitted with different CCE indexes in a frequency domain.

Illustrative Processes

FIG. 6 illustrates an example process 600 in accordance with an implementation of the present disclosure. Process

600 may be an example implementation of above scenarios/ schemes, whether partially or completely, with respect to improvement of a scheduling of multi-cell PUSCH/PDSCH transmission with a single DCI. Process 600 may represent an aspect of implementation of features of communication apparatus 510. Process 600 may include one or more operations, actions, or functions as illustrated by one or more of blocks 610 to 620. Although illustrated as discrete blocks, various blocks of process 600 may be divided into additional blocks, combined into fewer blocks, or eliminated, depending on the desired implementation. Moreover, the blocks of process 600 may be executed in the order shown in FIG. 6 or, alternatively, in a different order. Process 600 may be implemented by communication apparatus 510 or any suitable UE or machine type devices. Solely for illustrative purposes and without limitation, process 600 is described below in the context of communication apparatus 510. Process 600 may begin at block 610.

At 610, process 600 may involve processor 512 of an apparatus (e.g., communication apparatus 510) receiving a DCI scheduling a plurality of cells from a network node (e.g., network apparatus 520) of a wireless network, wherein the DCI includes at least one of a first DCI, a second DCI, and a third DCI, the first DCI corresponds to a one-segment DCI structure, and the second DCI and the third DCI correspond to a two-segment DCI structure. Process 600 may proceed from 610 to 620.

At 620, process 600 may involve processor 512 performing a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, a first part of bit fields of the first DCI, the second DCI or the third DCI are defined as the common bit field, and a second part of bit fields of the first DCI, the second DCI or the third DCI are configured as the common bit field or the designated bit fields. Then, process 600 may further involve processor 512 receiving an RRC configuration to configure which bit field of the first DCI, the second DCI or the third DCI to be the common bit field or to be the designated bit fields.

In some implementations, the first specific bit field or the second specific bit field includes a bitmap indicating a scheduling information of the plurality of cells. A size of the bitmap indicates a number of cells scheduled by the DCI. In an event that a sequence of the bitmap includes only one bit value, the DCI includes the first DCI. In an event that the DCI includes the second DCI and the third DCI to indicate a plurality of scheduled cells for the apparatus, one scheduled cell with a lowest cell index is indicated by the second DCI, and the other of the plurality of scheduled cells are indicated by the third DCI.

In some implementations, process 600 may further involve processor 512 determining that the DCI includes the second DCI or the third DCI according to an additional DCI bit or an RRC configuration. Then, process 600 may further involve processor 512 linking the second DCI and the third DCI after determining that the second DCI and the third DCI are received from one cell in a same time duration. Both the second DCI and the third DCI are DL scheduling DCI, or both the second DCI and the third DCI are UL scheduling DCI.

FIG. 7 illustrates an example process 700 in accordance with an implementation of the present disclosure. Process 700 may be an example implementation of above scenarios/ schemes, whether partially or completely, with respect to improvement of a scheduling of multi-cell PUSCH/PDSCH transmission with a single DCI. Process 700 may represent an aspect of implementation of features of network appara- tus 520. Process 700 may include one or more operations, actions, or functions as illustrated by one or more of blocks 710 to 720. Although illustrated as discrete blocks, various blocks of process 700 may be divided into additional blocks, combined into fewer blocks, or eliminated, depending on the desired implementation. Moreover, the blocks of process 700 may be executed in the order shown in FIG. 7 or, alternatively, in a different order. Process 700 may be implemented by network apparatus 520 or any suitable BS or network nodes. Solely for illustrative purposes and with- out limitation, process 700 is described below in the context of network apparatus 520. Process 700 may begin at block 710.

At 710, process 700 may involve processor 522 of a network node (e.g., network apparatus 520) configuring a DCI scheduling a plurality of cells, wherein the DCI includes at least one of a first DCI, a second DCI, and a third DCI, the first DCI corresponds to a one-segment DCI structure, and the second DCI and the third DCI correspond to a two-segment DCI structure. Process 700 may proceed from 710 to 720.

At 720, process 700 may involve processor 522 transmit- ting the DCI to an apparatus (e.g., communication apparatus 510) of a wireless network to schedule a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, a first part of bit fields of the first DCI, the second DCI or the third DCI are defined as the common bit field, and a second part of bit fields of the first DCI, the second DCI or the third DCI are configured as the common bit field or the designated bit fields. Then, process 700 may further involve processor 522 configuring an RRC configuration to indicate which bit field of the first DCI, the second DCI or the third DCI to be the common bit field or to be the designated bit fields.

In some implementations, the first specific bit field or the second specific bit field includes a bitmap indicating a scheduling information of the plurality of cells. A size of the bitmap indicates a number of cells scheduled by the DCI. In an event that a sequence of the bitmap includes only one bit value, the DCI includes the first DCI. In an event that the DCI includes the second DCI and the third DCI to indicate a plurality of scheduled cells for the apparatus, one sched- uled cell with a lowest cell index is indicated by the second DCI, and the other of the plurality of scheduled cells are indicated by the third DCI.

In some implementations, process 700 may further involve processor 522 indicating that the DCI includes the second DCI or the third DCI by an additional DCI bit or an RRC configuration.

FIG. 8 illustrates an example process 800 in accordance with an implementation of the present disclosure. Process 800 may be an example implementation of above scenarios/ schemes, whether partially or completely, with respect to improvement of a scheduling of multi-cell PUSCH/PDSCH transmission with a single DCI. Process 800 may represent an aspect of implementation of features of communication apparatus 510. Process 800 may include one or more opera- tions, actions, or functions as illustrated by one or more of blocks 810 to 840. Although illustrated as discrete blocks, various blocks of process 800 may be divided into additional blocks, combined into fewer blocks, or eliminated, depend- ing on the desired implementation. Moreover, the blocks of process 800 may be executed in the order shown in FIG. 8 or, alternatively, in a different order. Process 800 may be implemented by communication apparatus 510 or any suit- able UE or machine type devices. Solely for illustrative purposes and without limitation, process 800 is described below in the context of communication apparatus 510. Process 800 may begin at block 810.

At 810, process 800 may involve processor 512 of an apparatus (e.g., communication apparatus 510) receiving a DCI scheduling a plurality of cells from a network node (e.g., network apparatus 520) of a wireless network, wherein the DCI includes at least one of a first DCI, a second DCI, and a third DCI, the first DCI corresponds to a one-segment DCI structure, and the second DCI and the third DCI correspond to a two-segment DCI structure. Process 800 may proceed from 810 to 820.

At 820, process 800 may involve processor 512 deter- mining a DCI size budget of the DCI counted in one of the plurality of cells. Process 800 may proceed from 820 to 830.

At 830, process 800 may involve processor 512 perform- ing a DCI decoding according to the DCI size budget. Process 800 may proceed from 830 to 840.

At 840, process 800 may involve processor 512 perform- ing a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, process 800 may further involve processor 512 performing the DCI decoding accord- ing to a first decoding size for the DCI in an event that the DCI include the first DCI to configure a first number of the plurality of cells, wherein the first decoding size is deter- mined according to the first number of the plurality of cells.

In some implementations, process 800 may further involve processor 512 performing the DCI decoding accord- ing to a second decoding size for the DCI in an event that the DCI includes the second DCI and the third DCI to configure a second number of the plurality of cells, wherein the second decoding size includes four combinations. The second DCI includes a non-fallback size in an event that one cell is configured to the apparatus, the second DCI includes a non-fallback size and the third DCI includes a fallback size in an event that two cells are configured to the apparatus, both the second DCI and the third DCI include a non- fallback size in an event that three cells are configured to the apparatus, and the second DCI includes a non-fallback size and the third DCI comprises a 3-cell segment size in an event that four cells are configured to the apparatus.

FIG. 9 illustrates an example process 900 in accordance with an implementation of the present disclosure. Process 900 may be an example implementation of above scenarios/schemes, whether partially or completely, with respect to improvement of a scheduling of multi-cell PUSCH/PDSCH transmission with a single DCI. Process 900 may represent an aspect of implementation of features of communication apparatus 510. Process 900 may include one or more operations, actions, or functions as illustrated by one or more of blocks 910 to 940. Although illustrated as discrete blocks, various blocks of process 900 may be divided into additional blocks, combined into fewer blocks, or eliminated, depending on the desired implementation. Moreover, the blocks of process 900 may be executed in the order shown in FIG. 9 or, alternatively, in a different order. Process 900 may be implemented by communication apparatus 510 or any suitable UE or machine type devices. Solely for illustrative purposes and without limitation, process 900 is described below in the context of communication apparatus 510. Process 900 may begin at block 910.

At 910, process 900 may involve processor 512 of an apparatus (e.g., communication apparatus 510) receiving a DCI scheduling a plurality of cells from a network node (e.g., network apparatus 520) of a wireless network, wherein the DCI includes at least one of a first DCI, a second DCI, and a third DCI, the first DCI corresponds to a one-segment DCI structure, and the second DCI and the third DCI correspond to a two-segment DCI structure. Process 900 may proceed from 910 to 920.

At 920, process 900 may involve processor 512 determining a BD or CCE budget counted in one of the plurality of cells. Process 900 may proceed from 920 to 930.

At 930, process 900 may involve processor 512 performing a DCI decoding according to the BD or CCE budget. Process 900 may proceed from 930 to 940.

At 940, process 900 may involve processor 512 performing a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, process 900 may further involve processor 512 determining the BD or CCE budget by multiplying a pre-defined BD or CCE budget by a first scaling number in an event that the DCI includes the first DCI, wherein the first scaling number is no less than 1 and no more than a number of the plurality of cells. Then, process 900 may further involve processor 512 determining the BD or CCE budget by multiplying the pre-defined BD or CCE budget by a second scaling number in an event that the DCI includes the second DCI, wherein the second scaling number is no more than the number of the plurality of cells. Then, process 900 may further involve processor 512 determining the BD or CCE budget by multiplying the pre-defined BD or CCE budget by a third scaling number in an event that the DCI includes the third DCI, wherein the third scaling number is no more than the number of the plurality of cells. The first scaling number, the second scaling number or the third scaling number is pre-determined or configured by the network node. The second scaling number is greater than the third scaling number.

FIG. 10 illustrates an example process 1000 in accordance with an implementation of the present disclosure. Process 1000 may be an example implementation of above scenarios/schemes, whether partially or completely, with respect to improvement of a scheduling of multi-cell PUSCH/PDSCH transmission with a single DCI. Process 1000 may represent an aspect of implementation of features of network apparatus 520. Process 1000 may include one or more operations, actions, or functions as illustrated by one or more of blocks 1010 to 1030. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by network apparatus 520 or any suitable BS or network nodes. Solely for illustrative purposes and without limitation, process 1000 is described below in the context of network apparatus 520. Process 1000 may begin at block 1010.

At 1010, process 1000 may involve processor 522 of a network node (e.g., network apparatus 520) configuring a DCI scheduling a plurality of cells, wherein the DCI includes at least one of a first DCI, a second DCI, and a third DCI, the first DCI corresponds to a one-segment DCI structure, and the second DCI and the third DCI correspond to a two-segment DCI structure. Process 1000 may proceed from 1010 to 1020.

At 1020, process 1000 may involve processor 522 configuring a DCI size budget of the DCI counted in one of the plurality of cells to an apparatus (e.g., communication apparatus 510) of a wireless network. Process 1000 may proceed from 1020 to 1030.

At 1030, process 1000 may involve processor 522 transmitting the DCI to the apparatus (e.g., communication apparatus 510) to schedule a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

FIG. 11 illustrates an example process 1100 in accordance with an implementation of the present disclosure. Process 1100 may be an example implementation of above scenarios/schemes, whether partially or completely, with respect to improvement of a scheduling of multi-cell PUSCH/PDSCH transmission with a single DCI. Process 1100 may represent an aspect of implementation of features of network apparatus 520. Process 1100 may include one or more operations, actions, or functions as illustrated by one or more of blocks 1110 to 1130. Although illustrated as discrete blocks, various blocks of process 1100 may be divided into additional blocks, combined into fewer blocks, or eliminated, depending on the desired implementation. Moreover, the blocks of process 1100 may be executed in the order shown in FIG. 11 or, alternatively, in a different order. Process 1100 may be implemented by network apparatus 520 or any suitable BS or network nodes. Solely for illustrative purposes and without limitation, process 1100 is described below in the context of network apparatus 520. Process 1100 may begin at block 1110.

At 1110, process 1100 may involve processor 522 of a network node (e.g., network apparatus 520) configuring a DCI scheduling a plurality of cells, wherein the DCI includes at least one of a first DCI, a second DCI, and a third DCI, the first DCI corresponds to a one-segment DCI structure, and the second DCI and the third DCI correspond to a two-segment DCI structure. Process 1100 may proceed from 1110 to 1120.

At 1120, process 1100 may involve processor 522 configuring a BD or CCE budget counted in one of the plurality of cells to an apparatus (e.g., communication apparatus 510) of a wireless network. Process 1100 may proceed from 1120 to 1130.

At 1130, process 1100 may involve processor 522 transmitting the DCI to the apparatus (e.g., communication apparatus 510) to schedule a PDSCH reception or a PUSCH transmission with at least one of the plurality of cells based on the DCI, wherein the first DCI includes a common bit field, a first specific bit field and a plurality of designated bit fields corresponding to the plurality of cells, the second DCI includes the common bit field, a second specific bit field and a first part of the designated bit fields corresponding to at least one of the plurality of cells, and the third DCI includes a second part of the designated bit fields corresponding to at least one of the plurality of cells.

In some implementations, process 1100 may further involve processor 522 configuring the BD or CCE budget by multiplying a pre-defined BD or CCE budget by a first scaling number in an event that the DCI includes the first DCI, wherein the first scaling number is no less than 1 and no more than a number of the plurality of cells. Then, process 1100 may further involve processor 522 configuring the BD or CCE budget by multiplying the pre-defined BD or CCE budget by a second scaling number in an event that the DCI includes the second DCI, wherein the second scaling number is no more than the number of the plurality of cells. Then, process 1100 may further involve processor 522 configuring the BD or CCE budget by multiplying the pre-defined BD or CCE budget by a third scaling number in an event that the DCI includes the third DCI, wherein the third scaling number is no more than the number of the plurality of cells. The first scaling number, the second scaling number or the third scaling number is pre-determined or configured by the network node (e.g., network apparatus 520). The second scaling number is greater than the third scaling number.

FIG. 12 illustrates an example process 1200 in accordance with an implementation of the present disclosure. Process 1200 may be an example implementation of above scenarios/schemes, whether partially or completely, with respect to improvement of a scheduling of multi-cell PUSCH/PDSCH transmission with a single DCI. Process 1200 may represent an aspect of implementation of features of communication apparatus 510. Process 1200 may include one or more operations, actions, or functions as illustrated by one or more of blocks 1210 to 1230. Although illustrated as discrete blocks, various blocks of process 1200 may be divided into additional blocks, combined into fewer blocks, or eliminated, depending on the desired implementation. Moreover, the blocks of process 1200 may be executed in the order shown in FIG. 12 or, alternatively, in a different order. Process 1200 may be implemented by communication apparatus 510 or any suitable UE or machine type devices. Solely for illustrative purposes and without limitation, process 1200 is described below in the context of communication apparatus 510. Process 1200 may begin at block 1210.

At 1210, process 1200 may involve processor 512 of an apparatus (e.g., communication apparatus 510) transmitting a capability report to a network node (e.g., network apparatus 520) of a wireless network to indicate a maximum number of cells that can be simultaneously scheduled. Process 1200 may proceed from 1210 to 1220.

At 1220, process 1200 may involve processor 512 receiving a DCI scheduling one or multiple cells with a number of co-scheduled cells being smaller than or equal to the maximum number of cells, wherein the DCI includes at least one of a first DCI, a second DCI, and a third DCI, the first DCI corresponds to a one-segment DCI structure, and the second DCI and the third DCI correspond to a two-segment DCI structure. Process 1200 may proceed from 1220 to 1230.

At 1230, process 1200 may involve processor 512 performing a PDSCH reception or a PUSCH transmission with at least one of the number of co-scheduled cells based on the DCI, wherein the first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In some implementations, process 1200 may further involve processor 512 receiving a configuration of a plurality of cell sets for multi-cell scheduling in one cell group, wherein each of the plurality of cell sets includes at least one cell that can be simultaneously scheduled. Then, process 1200 may further involve processor 512 determining a CCE index of a search space for the DCI according to a cell set index. The cell set index is configured by the network node (e.g., network apparatus 520) corresponding to one of the plurality of cell sets.

In some implementations, process 1200 may further involve processor 512 receiving a plurality of DCIs corresponding to the plurality of cell sets, wherein each of the plurality of DCIs includes the first DCI. The plurality of DCIs are transmitted with different CCE indexes in a frequency domain.

FIG. 13 illustrates an example process 1300 in accordance with an implementation of the present disclosure. Process 1300 may be an example implementation of above scenarios/schemes, whether partially or completely, with respect to improvement of a scheduling of multi-cell PUSCH/PDSCH transmission with a single DCI. Process 1300 may represent an aspect of implementation of features of network apparatus 520. Process 1300 may include one or more operations, actions, or functions as illustrated by one or more of blocks 1310 to 1330. Although illustrated as discrete blocks, various blocks of process 1300 may be divided into additional blocks, combined into fewer blocks, or eliminated, depending on the desired implementation. Moreover, the blocks of process 1300 may be executed in the order shown in FIG. 13 or, alternatively, in a different order. Process 1300 may be implemented by network apparatus 520 or any suitable BS or network nodes. Solely for illustrative purposes and without limitation, process 1300 is described below in the context of network apparatus 520. Process 1300 may begin at block 1310.

At 1310, process 1300 may involve processor 522 of a network node (e.g., network apparatus 520) receiving a capability report from an apparatus (e.g., communication apparatus 510) of a wireless network to indicate a maximum number of cells that can be simultaneously scheduled for the apparatus (e.g., communication apparatus 510). Process 1300 may proceed from 1310 to 1320.

At 1320, process 1300 may involve processor 522 configuring a DCI scheduling one or multiple cells with a number of co-scheduled cells being smaller than or equal to the maximum number of cells, wherein the DCI includes at least one of a first DCI, a second DCI, and a third DCI, the first DCI corresponds to a one-segment DCI structure, and the second DCI and the third DCI correspond to a two-segment DCI structure. Process 1300 may proceed from 1320 to 1330.

At 1330, process 1300 may involve processor 522 transmitting the DCI to the apparatus (e.g., communication apparatus 510) to schedule a PDSCH reception or a PUSCH transmission with at least one of the number of co-scheduled cells, wherein the first DCI includes a common bit field, a first specific bit field and a plurality of designated bit fields corresponding to the number of co-scheduled cells, the second DCI includes the common bit field, a second specific bit field and a first part of the designated bit fields corresponding to at least one of the number of co-scheduled cells, and the third DCI includes a second part of the designated bit fields corresponding to at least one of the number of co-scheduled cells.

In some implementations, process 1300 may further involve processor 522 configuring a configuration of a plurality of cell sets for multi-cell scheduling in one cell group, wherein each of the plurality of cell sets includes at least one cell that can be simultaneously scheduled. Then, process 1300 may further involve processor 522 configuring a CCE index of a search space for the DCI according to a cell set index. Then, process 1300 may further involve processor 522 configuring the cell set index that corresponds to one of the plurality of cell sets.

In some implementations, process 1300 may further involve processor 522 transmitting a plurality of DCIs corresponding to the plurality of cell sets, wherein each of the plurality of DCIs includes the first DCI. The plurality of DCIs are transmitted with different CCE indexes in a frequency domain.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, a downlink control information (DCI) scheduling a plurality of cells from a network node of a wireless network, wherein the DCI comprises at least one of a first DCI, a second DCI and a third DCI, the first DCI corresponds to a one-segment DCI structure, and the second DCI and the third DCI correspond to a two-segment DCI structure;

determining, by the processor, a DCI size budget of the DCI counted in one of the plurality of cells;

performing, by the processor, a DCI decoding according to the DCI size budget; and performing, by the processor, a physical downlink shared channel (PDSCH) reception or a physical uplink shared channel (PUSCH) transmission with at least one of the plurality of cells based on the DCI, wherein the first DCI comprises a common bit field, a first specific bit field and a plurality of designated bit fields corresponding to the plurality of cells, the second DCI comprises the common bit field, a second specific bit field and a first part of the designated bit fields corresponding to at least one of the plurality of cells, and the third DCI comprises a second part of the designated bit fields corresponding to at least one of the plurality of cells, wherein the DCI decoding is performed according to a first decoding size for the DCI in an event that the DCI comprises the first DCI to configure a first number of the plurality of cells.

2. The method of claim 1, wherein the first decoding size is determined according to the first number of the plurality of cells.

3. The method of claim 1, wherein the performing of the DCI decoding comprises:

performing, by the processor, the DCI decoding according to a second decoding size for the DCI in an event that the DCI comprises the second DCI and the third DCI to configure a second number of the plurality of cells, wherein the second decoding size comprises four combinations.

4. The method of claim 3, wherein:

the second DCI comprises a non-fallback size in an event that one cell is configured to the apparatus, the second DCI comprises a non-fallback size and the third DCI comprises a fallback size in an event that two cells are configured to the apparatus, both the second DCI and the third DCI comprise a non-fallback size in an event that three cells are configured to the apparatus, and the second DCI comprises a non-fallback size and the third DCI comprises a 3-cell segment size in an event that four cells are configured to the apparatus.

5. A method, comprising:

receiving, by a processor of an apparatus, a downlink control information (DCI) scheduling a plurality of cells from a network node of a wireless network, wherein the DCI comprises at least one of a first DCI, a second DCI and a third DCI, the first DCI corresponds to a one-segment DCI structure, and the second DCI and the third DCI correspond to a two-segment DCI structure;

determining, by the processor, a blind decoding (BD) or control channel element (CCE) budget counted in one of the plurality of cells;

performing, by the processor, a DCI decoding according to the BD or CCE budget; and performing, by the processor, a physical downlink shared channel (PDSCH) reception or a physical uplink shared channel (PUSCH) transmission with at least one of the plurality of cells based on the DCI, wherein the first DCI comprises a common bit field, a first specific bit field and a plurality of designated bit fields corresponding to the plurality of cells, the second DCI comprises the common bit field, a second specific bit field and a first part of the designated bit fields corresponding to at least one of the plurality of cells, and the third DCI comprises a second part of the designated bit fields corresponding to at least one of the plurality of cells, wherein the determining of the BD or CCE budget comprises determining the BD or CCE budget by multiplying a pre-defined BD or CCE budget by a first scaling number in an event that the DCI comprises the first DCI.

6. The method of claim 5, wherein the first scaling number is no less than 1 and no more than a number of the plurality of cells.

7. The method of claim 6, wherein the determining of the BD or CCE budget comprises:

determining, by the processor, the BD or CCE budget by multiplying the pre-defined BD or CCE budget by a second scaling number in an event that the DCI comprises the second DCI, wherein the second scaling number is no more than the number of the plurality of cells.

8. The method of claim 7, wherein the determining of the BD or CCE budget comprises:

determining, by the processor, the BD or CCE budget by multiplying the pre-defined BD or CCE budget by a third scaling number in an event that the DCI comprises the third DCI, wherein the third scaling number is no more than the number of the plurality of cells.

9. The method of claim 8, wherein the first scaling number, the second scaling number or the third scaling number is pre-determined or configured by the network node.

10. The method of claim 8, wherein the second scaling number is greater than the third scaling number.

11. An apparatus implementable in a user equipment (UE), comprising:

a transceiver configured to communicate wirelessly; and a processor coupled to the transceiver and configured to perform, via the transceiver, operations comprising:

receiving, via the transceiver, a downlink control information (DCI) scheduling a plurality of cells from a network node of a wireless network, wherein the DCI comprises at least one of a first DCI, a second DCI, or a third DCI, the first DCI corresponds to a one-segment DCI structure, and the second DCI and the third DCI correspond to a two-segment DCI structure; and; and determining a DCI size budget of the DCI counted in one of the plurality of cells;

performing a DCI decoding according to the DCI size budget; and performing a physical downlink shared channel (PDSCH) reception or a physical uplink shared channel (PUSCH) transmission with at least one of the plurality of cells based on the DCI, wherein the first DCI comprises a common bit field, a first specific bit field and a plurality of designated bit fields corresponding to the plurality of cells, the second DCI comprises the common bit field, a second specific bit field and a first part of the designated bit fields corresponding to at least one of the plurality of cells, and the third DCI comprises a second part of the designated bit fields corresponding to at least one of the plurality of cells, wherein the DCI decoding is performed according to a first decoding size for the DCI in an event that the DCI comprises the first DCI to configure a first number of the plurality of cells.

12. The apparatus of claim 11, wherein the first decoding size is determined according to the first number of the plurality of cells.

13. The apparatus of claim 11, wherein the processor is further configured to perform operations comprising:

performing the DCI decoding according to a second decoding size for the DCI in an event that the DCI comprises the second DCI and the third DCI to configure a second number of the plurality of cells, wherein the second decoding size comprises four combinations.

14. The apparatus of claim 13, wherein:

the second DCI comprises a non-fallback size in an event that one cell is configured to the apparatus, the second DCI comprises a non-fallback size and the third DCI comprises a fallback size in an event that two cells are configured to the apparatus, both the second DCI and the third DCI comprises a non-fallback size in an event that three cells are configured to the apparatus, and the second DCI comprises a non-fallback size and the third DCI comprises a 3-cell segment size in an event that four cells are configured to the apparatus.

15. The apparatus of claim 11, wherein, in determining the BD or CCE budget, the processor is further configured to perform operations comprising:

determining a blind decoding (BD) or control channel element (CCE) budget counted in the one of the plurality of cells; and performing the DCI decoding according to the BD or CCE budget.

16. The apparatus of claim 15, wherein, in determining the BD or CCE budget, the processor is further configured to perform operations comprising:

determining the BD or CCE budget by multiplying a pre-defined BD or CCE budget by a first scaling number in an event that the DCI comprises the first DCI, wherein the first scaling number is no less than 1 and no more than a number of the plurality of cells.

17. The apparatus of claim 16, wherein, in determining the BD or CCE budget, the processor is further configured to perform operations comprising:

determining the BD or CCE budget by multiplying the pre-defined BD or CCE budget by a second scaling number in an event that the DCI comprises the second DCI, wherein the second scaling number is no more than the number of the plurality of cells.

18. The apparatus of claim 17, wherein the processor is further configured to perform operations comprising:

determining the BD or CCE budget by multiplying the pre-defined BD or CCE budget by a third scaling number in an event that the DCI comprises the third DCI, wherein the third scaling number is no more than the number of the plurality of cells.

19. The apparatus of claim 18, wherein the first scaling number, the second scaling number or the third scaling number is pre-determined or configured by the network node.

20. The apparatus of claim 18, wherein the second scaling number is greater than the third scaling number.

* * * * *